Jan. 16, 1968  L. HARRISON III  3,364,382
AUTOMATIC GENERATION AND DISPLAY OF ANIMATED FIGURES
Original Filed Nov. 29, 1962  12 Sheets-Sheet 1
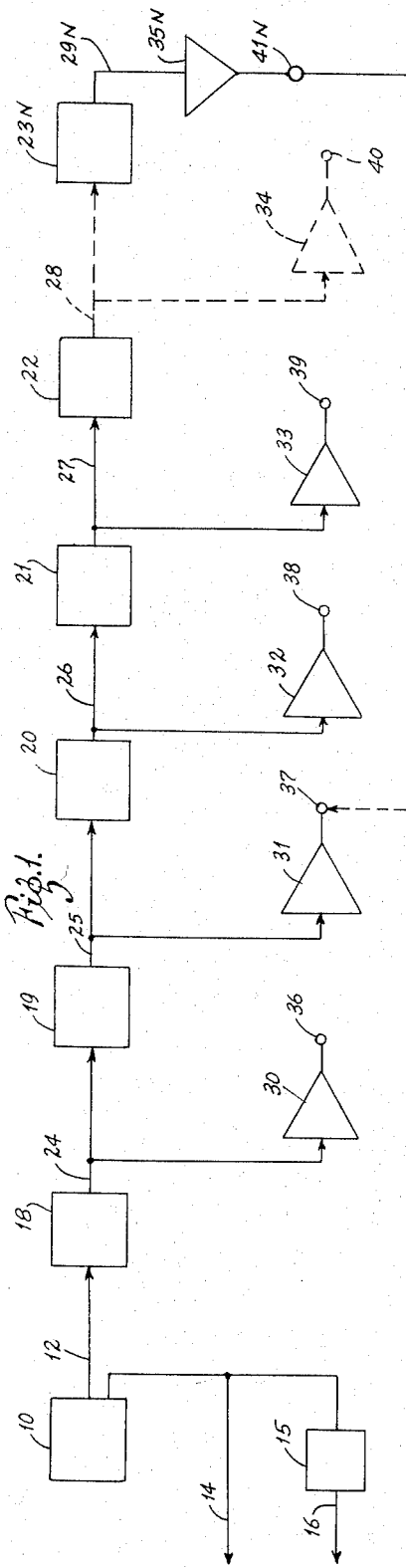
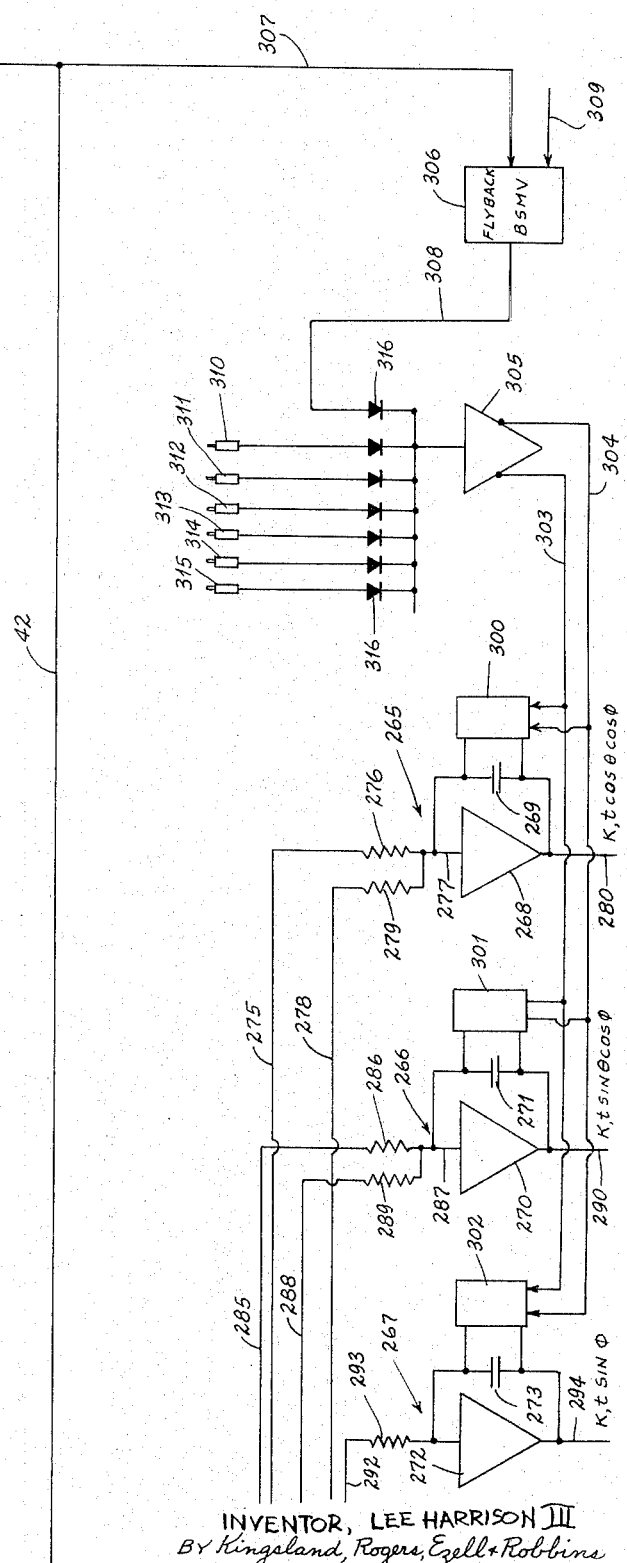
INVENTOR, LEE HARRISON III
BY Kingsland, Rogers, Ezell & Robbins
ATTORNEYS Jan. 16, 1968 L. HARRISON III 3,364,382
AUTOMATIC GENERATION AND DISPLAY OF ANIMATED FIGURES
Original Filed Nov. 29, 1962 12 Sheets-Sheet 7

INVENTOR
LEE HARRISON III
By Kingsland, Rogers, Ezell & Robbins
ATTORNEYS

Jan. 16, 1968 L. HARRISON III 3,364,382
AUTOMATIC GENERATION AND DISPLAY OF ANIMATED FIGURES
Original Filed Nov. 29, 1962 12 Sheets-Sheet 9
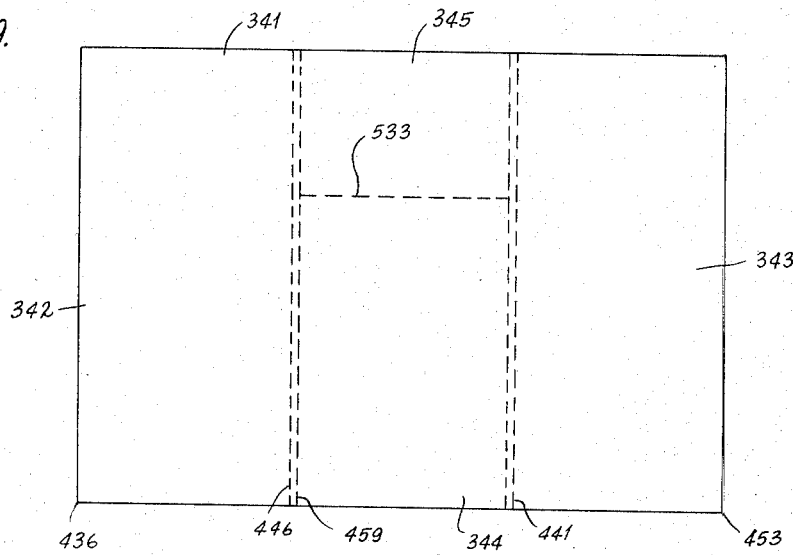
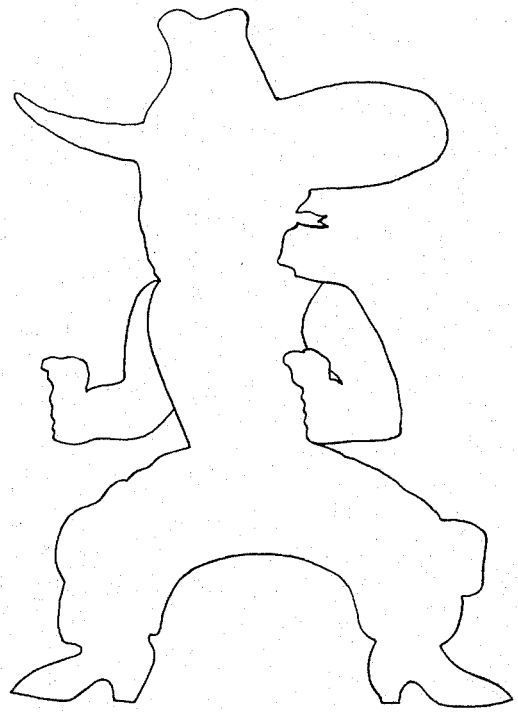
INVENTOR
LEE HARRISON III
BY Kingsland, Rogers, Ezell & Robbins
ATTORNEYS

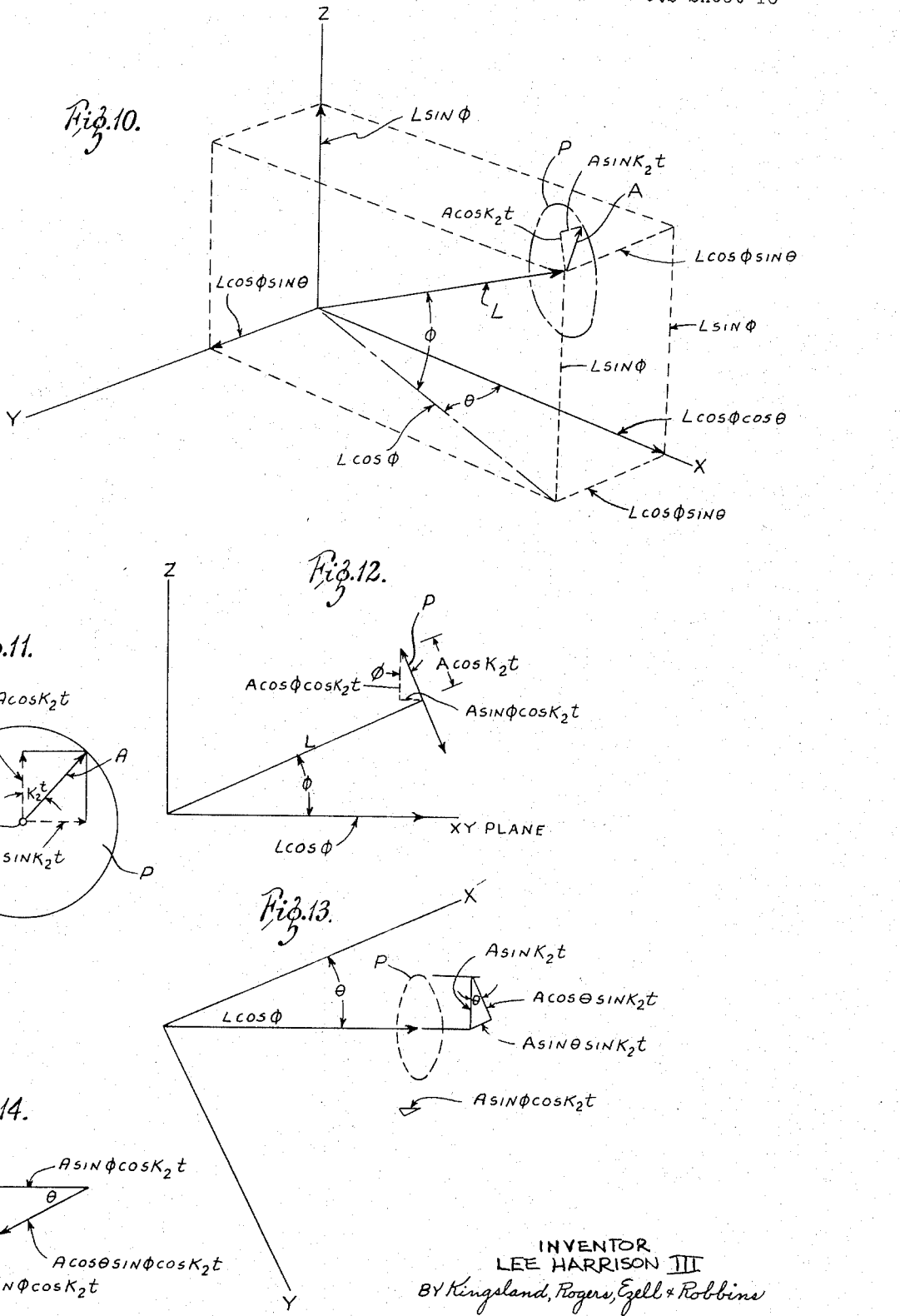

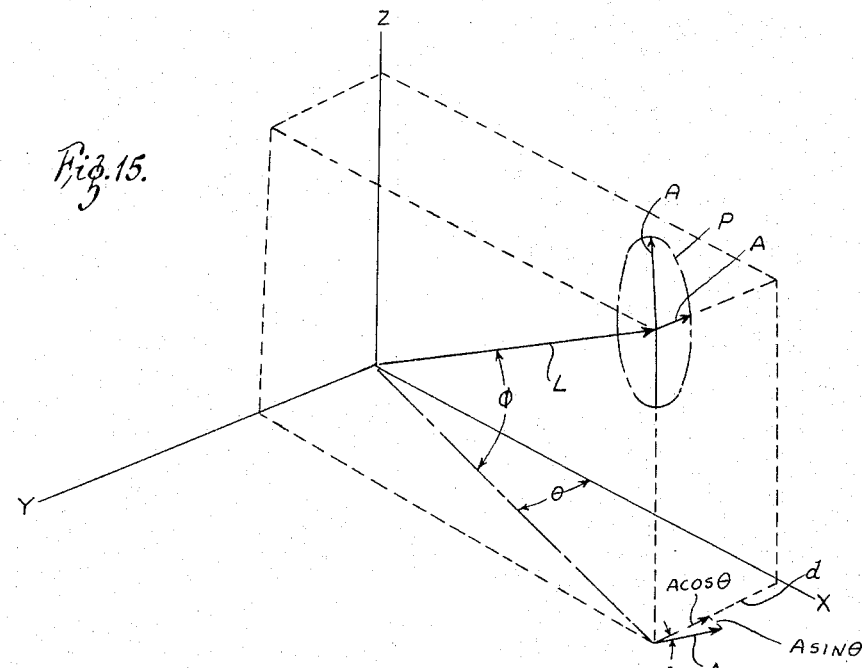
Fig. 15.
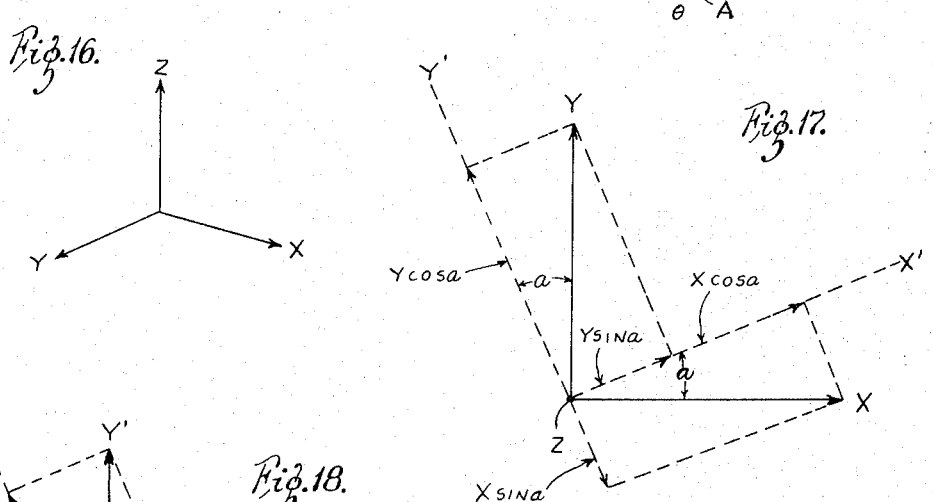
Fig. 16.
Fig. 17.
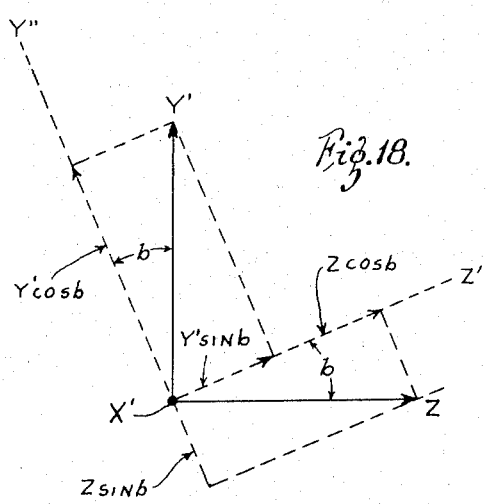
Fig. 18.
INVENTOR
LEE HARRISON III
BY Kingsland, Rogers, Ezell + Robbins
ATTORNEYS

Fig. 21.

United States Patent Office 3,364,382
Patented Jan. 16, 1968

3,364,382
AUTOMATIC GENERATION AND DISPLAY OF ANIMATED FIGURES
Lee Harrison III, Norristown, Pa., assignor to Control Image Corporation, New York, N.Y., a corporation of Delaware
Continuation of application Ser. No. 240,970, Nov. 29, 1962. This application Jan. 3, 1967, Ser. No. 607,078
53 Claims. (Cl. 315—18)

This is a continuation of Ser. No. 240,970, now abandoned.

This invention relates to a system for generating one or more figures, animating the figures, and displaying the animated figures as a series of high frequency displays. The general object of the invention is to provide a system whereby an operator can regulate a small number of inputs to generate one or more animated three dimensional figures which are thereafter resolved into two dimensions to produce an animated display on a display tube.

Broadly speaking, this invention provides a system for generating and displaying a sequence of picture frames at a frame rate which is compatible with the object of the display. If the display is for transmission over television, the frame rate would be identical to television frame rate, or if the display is to be photographed, the frame rate would correspond to that for motion picture photography. At any rate, the ultimate sequence of display can accommodate any motion of the display subjects including motions of human figures, cartoons and moving objects.

The subject matter to be displayed is stored information available to the system. This subject matter is animated by operation of the variable inputs to the machine, these inputs being any variable transducing elements, such as potentiometers or capacitors. These variable inputs are in circuits which relate to the solution of parametric equations to locate the different parts of the subject matter in three dimensions. As such, the variable inputs may be hand or mechanically operated controls, or they may be designed to receive variable signals from potentiometers or capacitors connected directly to movable members of a physical body for transmitting signals which vary in proportion to angular movements of the movable members. Whatever the input, animation can be created by an operator and the displayed figure can be made to go through all movements imaginable. In the case of live figure input, the system can be made to reproduce movements of the figure even though the figure be many miles distant from the system.

The principal components of this system include a master oscillator or clock, circuitry for generating voltages representing the axes of the different members of the figures and/or objects to be animated, hereinafter referred to as a bone generator network, and circuitry for generating voltages representing the radial distances of points on the surfaces of the figures and objects from their respective axes, hereinatfer referred to as a skin generator network. The clock controls the operation of the bone and skin generator networks. The bone generator network includes a means for generating groups of pulses for durations representing the lengths of various axes of members of figures and objects, conveniently called bones. At the same time, various voltages are introduced to position these bones in three-dimensional space. The positioning voltages are treated by a network that generates various trigonometric functions of the voltages which are parts of different parametric equations which must be solved to determine the different positions of different members being drawn. These trigonometric functions are then transmitted to an integrator the output of which produces voltages representing the instantaneous value of the bone positions.

The skin generator network has a means for scanning stored information to modulate the magnitude of a variable skin vector according to the distance of the skin from the bone. This variable length vector is treated by a network that superposes the trigonometric functions of the positioning voltages to relate the skin vector to the proper bone, and thereafter the skin vector is added to the bone.

The three-dimensional figure thus generated is transmitted to a camera angle network that can select any viewing angle and can transpose the three dimensions viewed from that angle into a two-dimensional display on the face of the display tube.

An important object of the invention is to provide a system that permits an operator to establish the levels of a plurality of variable inputs according to his desired animation pattern and that provides for recording inputs for automatic regulation of the system upon playback of the recorder to produce an automatic animated display on the face of a display tube.

Another object of the invention is to provide a system for generating and displaying animated sequences of one or more figures with provisions for controlling the variable inputs to generate and animate the figures automatically by stored information.

With the foregoing objects in mind, it is an object of this invention to provide a fast, lower cost means of picture animation with such a broad range of control and automation that the artistic range of the system is limited only by the operator's imagination.

It is another object of the invention to provide automatic display of the motion of a figure wherein the generation of motion in the system is produced by changes in low frequency, low bandwidth inputs so that the information dictating changes in these low bandwidth inputs can be transmitted over communications means of low bandwidth capabilities.

A more specific object of the invention is to provide a system having a network for generating the bones of a figure, a network for generating the skin associated with those bones, and a network for adding the skin to the bones to produce a three-dimensional figure, and also having a network for viewing the three-dimensional figure from any angle and displaying the figure as thus viewed. An additional object is to provide means for animating the figure.

Another specific object of the invention is to provide means for generating and animating a figure for display by the successive generation of the physical members of the figure with means to prevent overlap of the display when the generation of more than one of the physical members takes place at least in part over the same area of the display.

Still another specific object of the invention is to provide a system for generating and displaying animated figures and for modulating the intensity of the display to incorporate the minute physical characteristics of the figure and to provide shading for the figure.

Other objects and advantages will be apparent to those skilled in the art.

In the drawing:
FIGURE 1 is a block and schematic diagram of the clock, integrator, and flyback networks;
FIGURE 2 is a block diagram of the step counters and bone gates;
FIGURE 3 is a block and schematic diagram of the sine-cosine function generator;
FIGURE 4 is a block and schematic diagram of the equation solving network;
FIGURE 5 is a block and schematic diagram of the camera angle network and the gross position network;
FIGURE 6 is a block and schematic diagram of the program network for the skin scanning network;

FIGURE 9 is a plan view of a typical skin film;

FIGURES 10–14 are geometric diagrams illustrating the general theory of bone and skin generation;

FIGURE 15 is a geometric diagram illustrating the theory of generation of bones and skin for Mode Two operation;

FIGURES 16–18 are geometric diagrams illustrating the general theory of the camera angle network;

FIGURE 19 shows a typical figure display in Mode One operation;

FIGURE 20 shows a typical figure display in Mode Two operation; and

FIGURE 21 is a block and schematic diagram of the recording network.

Figure 2:
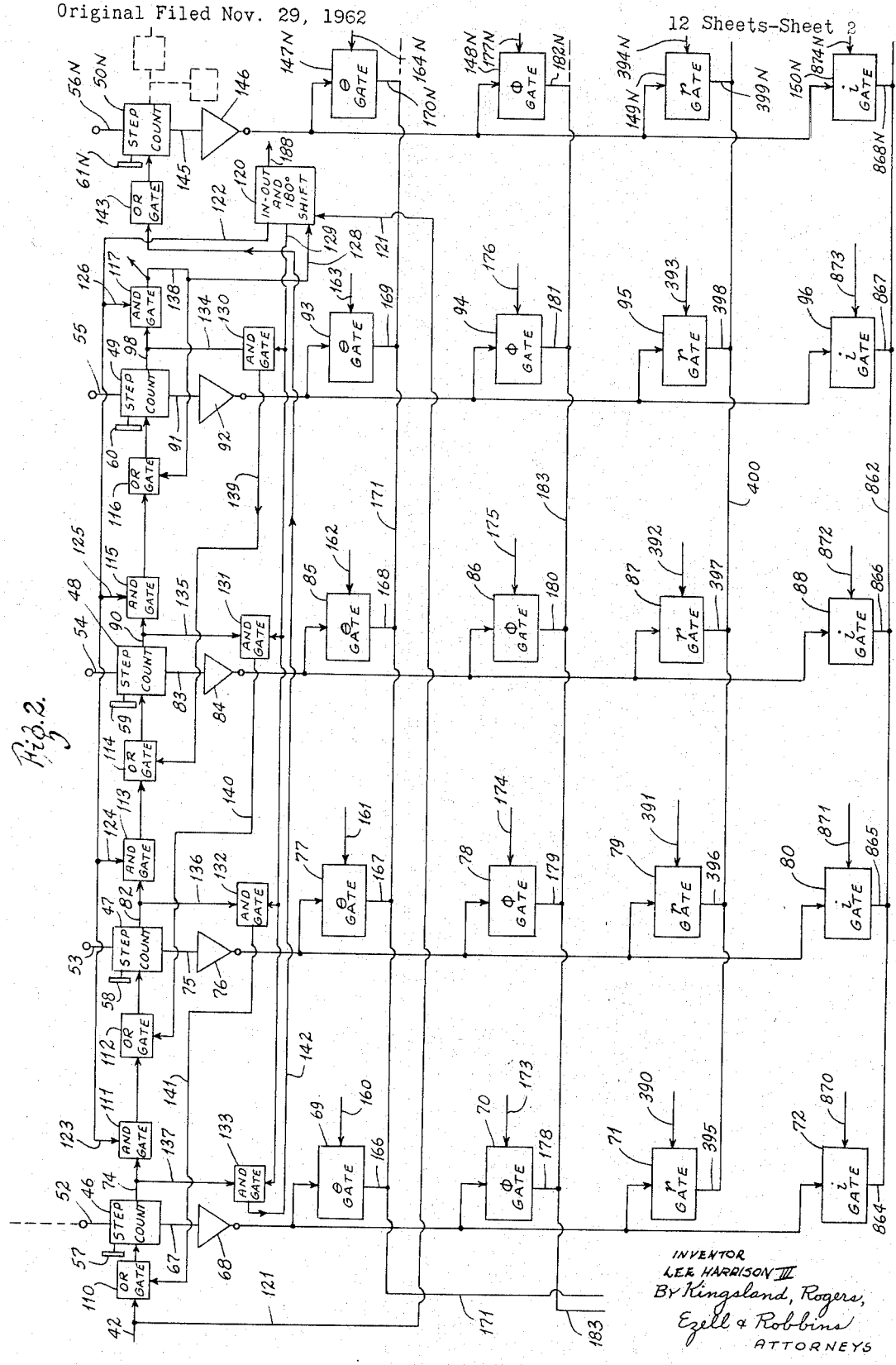

*General theory and analytical geometry of bone and skin generation for Mode One or full figure operation*

For purposes of illustration, the emphasis throughout the description of this invention centers upon the drawing of a human figure or animated figure having physical limbs and members. The text describes how the figure is generated for display on the face of a display tube, explaining the generation of each series of bones for the various parts of the figure, the generation of skin added to these bones, and the animation of the figure. The immediate investigation concerns the general theory of bone and skin generation, and for this consideration a typical bone and the skin for that bone are analyzed geometrically, as illustrated in FIGURES 10–14.

A typical bone is designated L in FIGURE 10. The bone is drawn at a constant rate of speed so that its length depends upon the rate that the drawing beam moves in drawing the bone and the period of time during which the drawing occurs. The rate is a constant for a given mode of operation and may be designated $k_1$. The time is variable and is designated $t$. Therefore, the length of the bone L is $k_1 t$.

The bone L is a single straight line as shown in FIGURE 10. Skin is added to the bone by what may be regarded as a twirling vector A that continues to rotate about the bone L. The vector A moves from the start of the bone to the end of the bone during the period of time $t$. As the bone L is generated, and during each incremental portion of the time $t$, the vector A rotates 360° about the bone L. (These increments of time $t$ will be more readily understood hereinafter.) A typical revolution of the end of the vector A is indicated in dotted lines P on FIGURE 10. The drawing ultimately made on the display tube depends upon the position of the tip or end of this vector A.

As viewed in FIGURES 10 and 11, the vector A may be thought of as rotating in a clockwise direction. It rotates at a constant angular speed the rate of which may be designated $K_2$. Therefore, the angular position of the vector A depends upon the product $K_2 t$.

The generation of the bone L will be considered first. Since the information available for display consists of voltages representing a three-dimensional figure, FIGURE 10 shows the bone L in reference to three-dimensional axes X, Y and Z. The angle that the projection of the bone L in the X, Y plane makes with the X axis is designated $\theta$. The angle that the bone L makes with the bone L makes with the X, Y plane is designated $\phi$. An examination of FIGURE 10 reveals the X, Y and Z components of the bone L.

The length of the projection of the bone L on the X, Y plane is equal to $L \cos \phi$. Therefore, $X = L \cos \phi \cos \theta$. But since the length of the bone L is $k_1 t$, $x = k_1 t \cos \theta \cos \phi$.

It follows that $Y = k_1 t \sin \theta \cos \phi$ and $Z = k_1 t \sin \phi$.

In considering the generation of skin for the bone L, it may be assumed that the vector A always rotates in a plane perpendicular to the bone, although this angle may be varied. In FIGURES 10–13, the plane of rotation of the vector A is drawn perpendicular to the bone L. As already mentioned, the angular position of the vector A depends upon the product $k_2 t$. FIGURE 11 shows this plane of rotation of the vector A and is drawn perpendicular to the bone L. As shown in FIGURE 11, the vector A always has two components that vary with the cosine and sine of the angle $k_2 t$. The length of these components are $A \cos k_2 t$ and $A \sin k_2 t$. These components are shown on FIGURE 11 with the appropriate legends.

FIGURES 12, 13 and 14 show how the skin vector A is resolved into its X, Y and Z components. The coordinates of FIGURE 12 are the Z axis and the X, Y plane and the plane of FIGURE 12 is defined by the Z axis, the bone L, and the projection of the bone L on the X, Y plane, that projection bearing the legend $L \cos \phi$ in FIGURE 10. Since FIGURE 12 shows the bone L in its true length, it views the plane of rotation of the vector A from the side. Therefore, that plane, designated P, appears as a straight line in FIGURE 12, normal to the bone L, and with the length above the bone L and the length below the bone L each being equal to $A \cos k_2 t$. Since the angle between the plane P and a vertical line drawn from the end of the bone L is equal to $\phi$, a horizontal line connecting that vertical line with the end of the plane P is equal to $A \sin \phi \cos k_2 t$. In other words, the projection of the $A \cos k_2 t$ vector on the X,Y plane abscissa of FIGURE 12 equals $A \sin \phi \cos k_2 t$. The projection of this $A \cos k_2 t$ vector on hte Z axis equals $A \cos \phi \cos k_2 t$, which is the Z component of the A vector, since in FIGURE 12, $A \sin k_2 t = 0$.

FIGURE 13 is a plane through the X and Y coordinates projected from FIGURE 12. In this view, the maximum length of a line drawn from the end of the $L \cos \phi$ projection to the outer extremity of the plane P is equal to the $A \sin k_2 t$ component of the vector A. Since the angle between the $L \cos \phi$ projection and the X axis is $\theta$, the component $A \sin k_2 t$ can be resolved into its X and Y components as indicated, whereby the X component is $A \sin \theta \sin k_2 t$ and the Y component is $A \cos \theta \sin k_2 t$.

In FIGURE 13, the projection $A \sin \phi \cos k_2 t$ is also shown, and as illustrated in FIGURE 14, this component may be resolved into X and Y components whereby the X component is $A \cos \theta \sin \phi \cos k_2 t$, and the Y component is $A \sin \theta \sin \phi \cos k_2 t$.

Since the vector A rotates 360° about the bone L, its X, Y and Z components will vary between positive and negative values. However, from an examination of the direction of the vectors illustrated in FIGURES 13 and 14, it can be seen that the net X component of the vector A is always equal to the difference between the quantities $A \cos \theta \sin \phi \cos k_2 t$ and $A \sin \theta \sin k_2 t$, and the Y component of the vector A is always equal to the sum of the components $A \sin \theta \sin \phi \cos k_2 t$ and $A \cos \theta \sin k_2 t$.

From the foregoing description, it is evident that the components for the generation of the bone L with skin are as follows:

$X = k_1 t \cos \theta \cos \phi + A \cos \theta \sin \phi \cos k_2 t - A \sin \theta \sin k_2 t$
$Y = k_1 t \sin \theta \cos \phi + A \sin \theta \sin \phi \cos k_2 t + A \cos \theta \sin k_2 t$
$Z = k_1 t \sin \phi + A \cos \phi \cos k_2 t$

*Bone and skin generation for mode two or figure outline*

As will be explained hereinafter, there are times, especially during rapid animation, when only an outline of the figure is to be drawn. For Mode Two operation, the figure displayed on the face of the display tube shows only an outline of the skin in the X, Y plane.

For Mode Two, an appropriate constant is substituted for the high frequency sinusoidal factors $\sin k_2 t$ and $\cos k_2 t$ of the general equations for X, Y, and Z. These equations then represent the generation of skin volume. In other words the twirling vector A is no longer twirling, and the specific case of interest is the solution to the general equations when $k_2t=90°$ and $k_2t=-90°$, that is, when the vector A is parallel to the viewing plane, for this case the XY plane. (The selection of ±90° for angle $k_2t$ is in keeping with the phase coordinates of vector A which were used to develop the general equations. In other words (FIGURE 13) when $k_2t=90°$, $A$ sin $k_2t=A\times 1=A$.)

Therefore, by substituting the values ±90° for $k_2t$ in the X, Y and Z components of the general equations, the resulting equations are:

$$X=k_1t \cos\theta \cos\phi \pm A \sin\theta$$
$$Y=k_1t \sin\theta \cos\phi \pm A \cos\theta$$
$$Z=k_1t \sin\phi$$

In this particular case there is no Z component of A, and the figure being generated may be thought of as being bat.

FIGURE 15 illustrates the theory of skin and bone generation for Mode Two. In Mode Two, the generation of the X, Y and Z components for the bone L is the same as was described in connection with FIGURES 10–14. To add the X, Y and Z components of the skin outline, it is only necessary to determine the X, Y and Z components of the circumference of the circle P generated by rotation of the vector A. The radius of this circle P is A. Referring to FIGURE 15, it is evident that the projection of the vector A in the XY plane does not change the length of the vector A. Since the angle that this projection A of the vector A makes with a line D drawn normal to the axis $A$ is $\theta$, it follows that the X component of the vector A is $A \sin\theta$ and the Y component is $A \cos\theta$.

Accordingly, the equations for the X, Y and Z components of the bone and skin are as follows:

$$X=k_1t \cos\theta \cos\phi \pm A \sin\theta$$
$$Y=k_1t \sin\theta \cos\phi \pm A \cos\theta$$
$$Z=k_1t \sin\phi$$

In these equations, the A component may be positive or negative.

*Geometric theory of camera angle network-resolution into two dimensions*

The three-dimensional figure must be resolved into horizontal H and vertical V components for display on the face of the display tube. To do this, the three components X, Y and Z of the three-dimensional figure must be resolved into two components H and V.

To illustrate this resolution, it may be assumed that the X, Y and Z axes of FIGURE 16 represent the X, Y and Z components of a point that is to be resolved into two components. As the system is illustrated, the entire figure is rotatable about the Z axis. The angle through which this rotation occurs is designated $a$ as indicated in FIGURE 17. This rotation produces new coordinates X' and Y' wherein $X'=X \cos a + Y \sin a$ and $$Y'=Y \cos a - X \sin a$$

The system also provides for rotation of the Y' Z plane about the X' axis, as illustrated in FIGURE 18. This angle of rotation is designated $b$ and establishes two axes Y" and Z'. This rotation of FIGURE 18 produces the quantities $Y''=Y' \cos b - Z \sin b$ and $$Z'=Z \cos b + Y' \sin b$$

From an analysis of FIGURES 17 and 18, it is apparent that the quantities X' and Y" may be used to represent two dimensional axes wherein variations of the angles $a$ and $b$ permit viewing of a three-dimensional figure from any angle. Therefore, the components of the display scope are as follows:

$$H=X \cos a + Y \sin a$$
$$V=(Y \cos a - X \sin a) \cos b - Z \sin b$$

*Clock control*

Referring to FIGURE 1, the entire system is regulated and controlled by a high frequency master oscillator 10.

Figure 8:
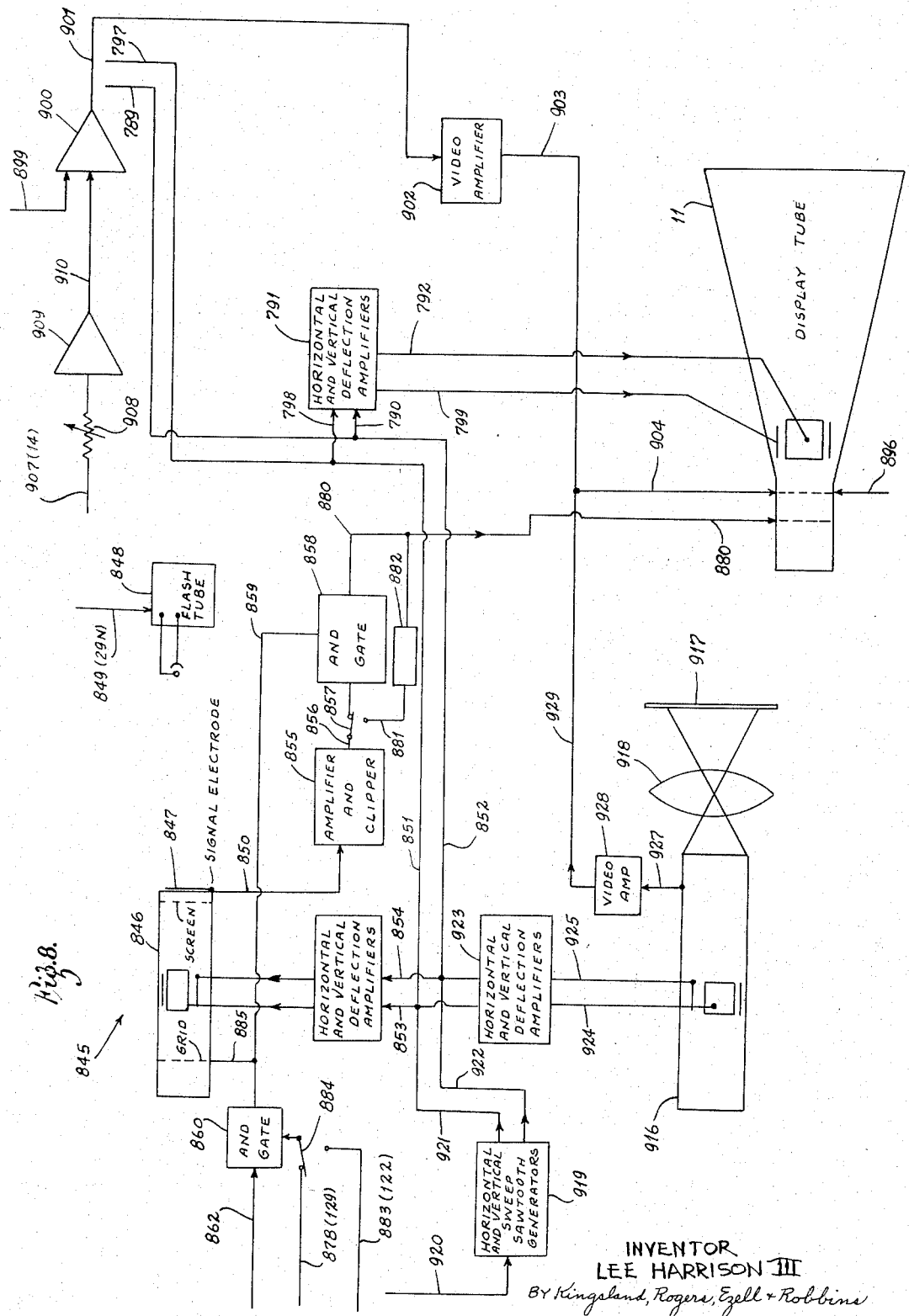
FIGURE 8 is a block and schematic diagram of the display tube, the overlap prevention network, and the background information generator.

A cathode ray display tube 11, shown in FIGURE 8, develops a display that can be photographed. The network between the master oscillator or clock 10 and the display tube 11 determine the nature of the display.

The clock 10 has two wave outputs 12 and 14. The frequencies of the waves at the outputs 12 and 14 are the same, but one of the outputs 12 is a square wave and the other one 14 is a conventional sine wave. The sine wave 14 generated by the master oscillator is itself used in the system, and this sine wave output is also fed through a 90° phase shifter 15 the output 16 of which is a cosine wave 90° out of phase with, but of the same frequency as, the sine wave output 14. The functions of the sine wave output 14 and the cosine wave output 16 will be described hereinafter.

The square wave output 12 is carried to the successive inputs of a series of bistable multivibrators 18, 19, 20, 21, 22 and 23N, each of which halves the frequency of its input. (Here and elsewhere in this description the suffix N is used to indicate there may be a variation in the number of devices used.) Each of the bistable multivibrators has an output 24, 25, 26, 27, 28 and 29N, respectively, which, except for the last output 29N, is connected to the input of the next succeeding multivibrator. An appropriate number of such multivibrators 18–23N are used, so that the frequency of the output of the last multivibrator 23N is equal to an acceptable frame frequency ultimately used for the display to be photographed. For example, an acceptable and conventional frame frequency for motion picture films is twenty-four frames per second. Therefore, if six bistable multivibrators 18–23N are used, the frequency of the square wave 12 (and the sine wave 14) generated by the master oscillator is set at 1536 cycles per second. Accordingly, changes in the output frequency of the master oscillator produce changes in the frame frequency unless additional multivibrators 18–23N are used. Since the master oscillator 10 regulates everything else in the system, any such change in its frequency also causes other system operations to remain synchronized with the frame frequency. As will be evident hereinafter, the higher the frequency of the master oscillator 10, the greater will be the resolution of the final picture displayed. A higher frequency oscillator merely requires the use of additional multivibrators 18–23N.

The outputs 24–29N from them ultivibrators are also delivered through cathode followers 30, 31, 32, 33, 34 and 35N, respectively (or through buffer amplifiers or similar devices to stabilize the back impedance as is conventional in the art), to individual terminal plugs 36, 37, 38, 39, 40 and 41N, respectively. It is possible that during operation of the system not all of the bistable multivibrator outputs 24–29N will be used, except as an input to the next multivibrator, but the last multivibrator 23N always feeds its frame frequency square wave output 29N through a conductor 42 to the first of a series of storage counters or step counters 46, 47, 48, 49 and 50N (see FIGURE 2). The frame pulse output 29N is also used for other purposes that will be described.

*Bone generators*

There are a plurality of "and" gates, and "or" gates associated with the storage counters 46–50N, but these will be described later. At present, the storage counters, at least the storage counters 46–49, may be thought of as being directly connected together in a series. The storage counters 46, 47, 48, 49 and 50N are themselves conventional devices normally comprising a storage circuit and a bistable multivibrator. The storage counters have separate inputs 52, 53, 54, 55 and 56N, respectively. Each of these inputs is connected to one of the terminal plugs 36, 37, 38, 39, 40 or 41N. Although not always, the inputs 52–56N are sometimes connected to a common terminal plug, such as to the plug 37 as indicated by dotted lines on the drawing. The length of the bone being drawn, and the capacity of the storage counter determines the choice of connections 36–41N. Each storage counter counts a variable number of pulses transmitted to its inputs 52, 53, 54, 55 or 56N.

The duration of the "set" state of each storage counter is controlled by an intrinsic capacitive network (not shown) wherein the capacitor is variable to provide independent regulation of the "set" state for each storage counter. These variable capacitors may be controlled by conventional hand controls 57, 58, 59, 60 and 61N associated with the storage counters 46–50N, respectively. The setting of a variable capacitor, such as the control 57, determines the number of pulses presented to the input 52 that the storage counter 46 will count.

Although only five storage counters 46–50N are illustrated, there are actually a much larger number. The storage counters are in convenient groups of various number depending upon what object they are associated with. For example, if a human figure is to be drawn, there may be four storage counters 46, 47, 48 and 49 for serially stepping off lengths of a placement bone, the upper arm bone, the lower arm bone, and the hand. For purposes of illustration, the four storage counters 46, 47, 48 and 49 constitute such an arm group and the storage counter 50N may be thought of as the first of a series constituting another group, as a leg group.

The first storage counter 46 is triggered by the frame pulse 29N (see FIGURE 1) transmitted through the conductor 42 and flips to its "set" state for a duration determined jointly by its input 52 and the control 57. The storage counter 46 has an output 67 the voltage level of which changes when the storage counter changes states. This change in the output voltage 67 is fed through a cathode follower 68 (or buffer amplifier) and provides a common (operating) input to a blank of gates 69, 70, 71 and 72 to open the gates for the period of time the storage counter 46 is in its "set" or pulse counting state.

The step counter 46 automatically flips back to its "reset" or quiescent state at the end of the period determined by the input 52 and the control 57. At this time, the storage counter 46 delivers a voltage to another output 74, which voltage is of the correct value to flip the next storage counter 47 to its "set" state. For the duration of the "set" state of the storage counter 47, which is determined by its input 53 and the control 58, a change in voltage at an output 75 occurs which is fed through a cathode follower 76 and simultaneously opens a bank of gates 77, 78, 79 and 80. Upon flipping back to its "reset" state, the storage counter 47 generates a voltage at another output 82 that is of proper value to flip the next storage couner 48.

The storage counters 48 and 49 are connected to operate like the storage counters already described. Thus, the storage counter 48 has an output 83 fed through a cathode follower 84 that opens a bank of gates 85, 86, 87 and 88 during the "set" state and an output 90 that causes the next storage counter 49 to flip to its "set" state. The storage counter 49 has an output 91 that goes through a cathode follower 92 and opens a bank of gates 93, 94, 95 and 96 and an output 98 that flips the next storage counter. However, the storage counter 49 is the last one of the arm group, which leads to the significance of the "and" gates and "or" gates.

In the preceding description, it was assumed that the storage counters 46–49 were directly connected together in a series chain. Actually, the input pulse 42 to the first storage counter must first pass through an "or" gate 110. The output 74 from the storage counter 46 must pass through an "and" gate 111 and an "or" gate 112 before it can trigger the storage counter 47. The output 82 from the step counter 47 must pass through an "and" gate 113 and an "or" gate 114 before it can trigger the storage counter 48. And the output 90 from the storage counter 48 must pass through an "and" gate 115 and an "or" gate 116 before it can trigger the storage counter 49. Also, the output 98 from the last storage counter 49 of the arm group is delivered as an input to an "and" gate 117.

There is an "in-out" bistable multivibrator 120 having an "out" input conductor 121 connected to the output conductor 42 from the frame pulse multivibrator 23N. Therefore, when a trigger pulse is transmitted to the "or" gate 110, it is also delivered to the multivibrator 120 and flips the multivibrator to its "out" condition. The multivibrator 120 has an "out" output 122 that passes a voltage when the multivibrator is in the "out" condition. This output is delivered as inputs 123, 124, 125 and 126 to the "and" gates 111, 113, 115 and 117, respectively.

The "in-out" multivibrator 120 also has an "in" input 128 connected to the output from the "and" gate 117 on the output side of the storage counter 49. A signal in the "in" input 128 flips the multivibrator 120 to its "in" condition. There is an "in" output conductor 129 that receives a voltage when the multivibrator is in its "in" condition. This conductor simultaneously delivers whatever voltage it carries to a group of "and" gates 130, 131, 132 and 133.

Another input conductor 134 to the "and" gate 130 is connected from the output side of the storage counter 49. An input conductor 135 to the "and" gate 131 is connected from the output side of the step counter 48. An input conductor 136 to the "and" gate 132 is connected from the output side of the step counter 47. And an input conductor 137 to the "and" gate 133 is connected from the output of the step counter 46.

The "and" gate 117 has an output conductor 138 connected as an input to the "or" gate 116 on the input side of the step counter 49. The "and" gate 130 has an output conductor 139 connected as an input to the "or" gate 114. The "and" gate 131 has an output conductor 140 connected to the input side of the "or" gate 112. The "and" gate 132 has an output conductor 141 connected to the input side of the "or" gate 110.

The "and" gate 133 has an output conductor 142 connected to the input side of another "or" gate 143 leading to the first step counter 60N of the next (leg) group of step counters. This step counter 50N has an output 145 that is connected through a cathode follower 146 to a bank of gates 147N, 148N, 149N and 150N.

The several "and" gates and "or" gates just described are of conventional construction. Each "and" gate transmits an output signal only when there are simultaneous inputs at both its inputs. Each "or" gate acts as a valve that will pass a voltage at either of its inputs to its output, but not to the other input.

With the bistable multivibrator 120 hooked up as described, it is flipped to its "out" condition whenever a frame pulse from the last multivibrator 23N passes through the conductor 121. While the multivibrator 120 is in its "out" condition, it passes a voltage through the "out" output 122. At this time, there is no signal in the "in" output conductor 129. Hence the "and" gates 130, 131, 132 and 133 pass no signal through their output conductors 139, 140, 141 and 142 to the "or" gates 114, 112 and 110 and 143. Under these conditions, the signal from the conductor 42 can pass through the "or" gate 110 to the step counter 46. Since the "out" conductor 122 is delivering a voltage to the "and" gate 111, when an output voltage from the step counter 46 reaches the "and" gate 111 it passes through to the "or" gate 112 and thence to the step counter 47. Likewise, the output 82 from the step counter 47 passes through the "and" gate 113 and the "or" gate 114 to the step counter 48, and the output 90 from the step counter 48 passes through the "and" gate 115 and the "or" gate 116 to the step counter 49.

When the storage counter 49 delivers a voltage to its output 98, that voltage passes through the "and" gate 117 to its output conductor 138 and also through the "in" input conductor 128 to the "in-out" bistable multivibrator 120. This flips the multivibrator 120 to its "in" condition, blocking off the "out" output 122 and causing the transmission of a voltage through the "in" output conductor 129. Now the conductor 122 is delivering no input voltage to the "and" gates 111, 113, 115 and 117 so these gates cannot pass any voltages from the storage counters; but the conductor 129 transmits its voltage as inputs to the "and" gates 130, 131, 132 and 133.

Under these conditions, the output voltage 138 passes through the "or" gate 116 and flips the storage counter 49 to its "set" state. When the storage counter 49 flips back to its reset state, its output voltage 98 cannot pass through the "and" gate 117, but is provides a second input to the "and" gate 130 and passes through the conductor 139 to the "or" gate 114. The "or" gate 114 passes this voltage and triggers the storage counter 48.

The output 90 from the storage counter 48 cannot pass through the "and" gate 115, but does pass through the "and" gate 131, the conductor 140, and the "or" gate 112 to trigger the storage counter 47. The output 82 from the storage counter 47 passes through the "and" gate 132 and the "or" gate 110 to trigger the first storage counter 46. Then the output 74 from the storage counter 46 passes through the "and" gate 133 and the conductor 142 to the "or" gate 143 and the first step counter 50N of the next (leg) group.

Of course each time these storage counters are flipped to their "set" states, they cause those gates which are connected to their outptus to open as has been described. Therefore, during the "in" condition of the "in-out" bistable multivibrator 120, there is an exact reversal in the order of operation of the storage counters and their associated gates.

The first gate of each bank is a $\theta$ gate. Thus, the gates 69, 77, 85, 93 and 147N are $\theta$ gates connected to the successive outputs of the storage counters 46, 47, 48, 49 and 50N as has been described. These $\theta$ gates have variable DC (or other) inputs 160, 161, 162, 163 and 164N, the magnitudes of which may be independently regulated by hand controlled potentiometers or any number of other means. These DC voltage inputs are passed to the respective $\theta$ gate outputs 166, 167, 168, 169 and 170N, all of which outputs are connected to a common conductor 171.

The next gates 70, 78, 86, 94 and 148N are the $\phi$ gates. These gates have variable DC voltage or other inputs 173, 174, 175, 176, and 177N, which may also be regulated by hand controlled potentiometers. These $\phi$ gates have outputs 178, 179, 180, 181, and 182N which are connected to a common conductor 183.

The gates 71, 79, 87, 95 and 149N are $r$ gates for establishing certain rotational conditions, and the gates 72, 80, 88, 96, and 150N are $i$ gates for regulating the intensity of the display beam. These gates and this function will be described in detail hereinafter.

*Sine-cosine function generator*

Figure 3:
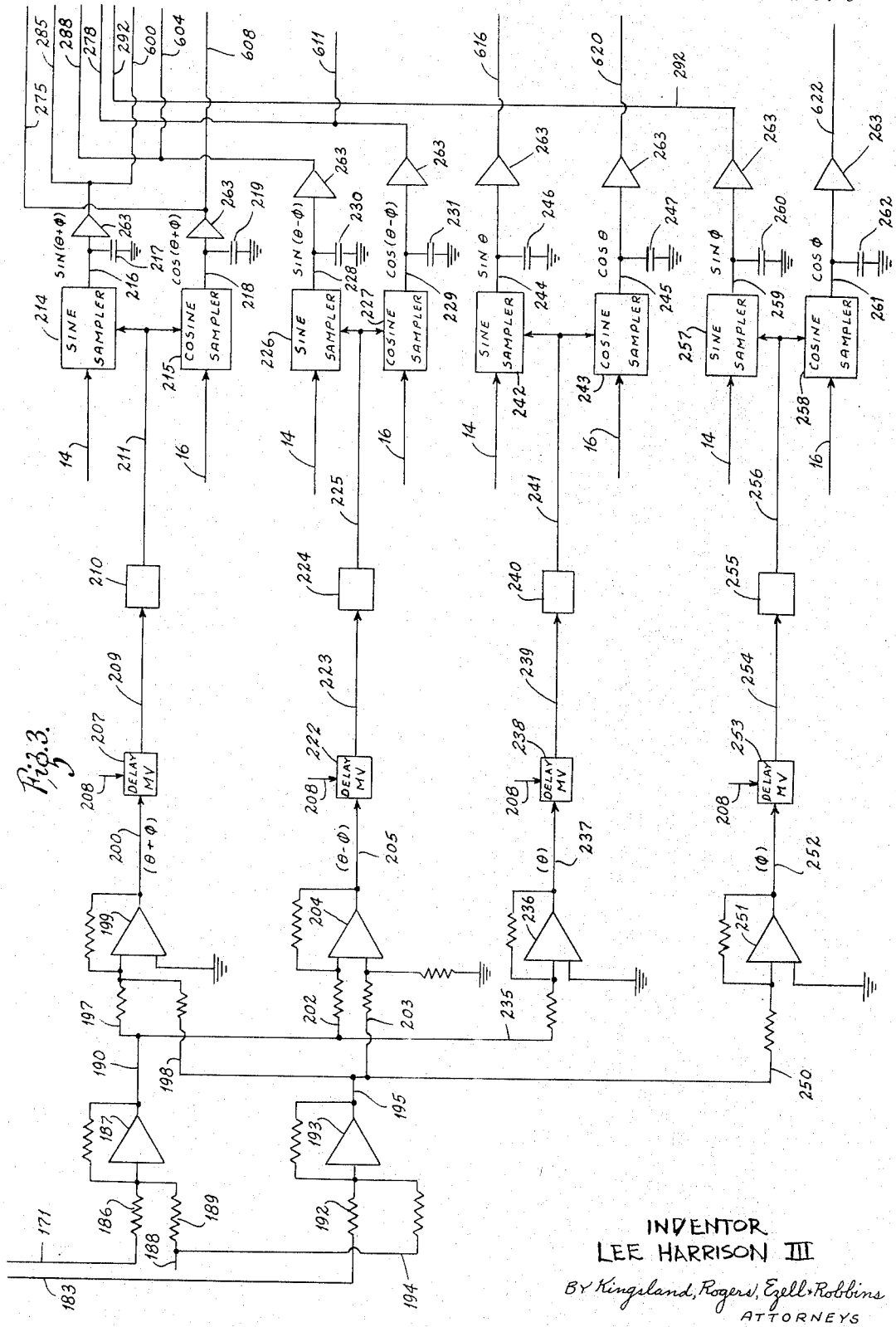

The conductor 171 which carries a voltage representing the magnitude of the angle $\theta$ for whatever bone is being drawn is connected through a resistor 186 to the input side of an operational amplifier 187 (see FIGURE 3). Another input conductor 188 through a resistor 189 to the operational amplifier 187 comes from the "in-out" bistable multivibrator 120. A pulse in the conductor 188 operates to shift the angle $\theta$ 180° during the "in" condition of the multivibrator 120. Therefore, the output 190 from the operational amplifier 187 represents either the angle $\theta$ (during the "out" condition of the multivibrator 120) or a 180° inversion of the angle $\theta$ (during the "in" condition of the multivibrator 120).

The conductor 183 that carries the outputs from the $\phi$ gates 173 through 177N is connected through a resistor 192 to an operational amplifier 193. These is another input conductor 194 to the operational amplifier 193 that is connected from the bistable multivibrator 120 to shift the angle $\phi$ by 180° when the multivibrator 120 is in its "in" condition. Hence, the operational amplifier 193 has an output 195 of a voltage representing either the angle $\phi$ or a 180° inversion of the angle $\phi$.

A sine-cosine function generator performs different geometrical operations upon these voltages representing the angles $\theta$ and $\phi$ or their 180° counterparts. The sine-cosine function generator takes advantage of certain geometric facts:

$\cos \theta \cos \varphi = \frac{1}{2} \sin (\theta+\varphi) + \frac{1}{2} \cos (\theta-\varphi)$
$\cos \theta \sin \varphi = \frac{1}{2} \sin (\theta+\varphi) - \frac{1}{2} \sin (\theta-\varphi)$
$\sin \theta \cos \varphi = \frac{1}{2} \sin (\theta+\varphi) + \frac{1}{2} \sin (\theta-\varphi)$
$\sin \theta \sin \varphi = \frac{1}{2} \cos (\theta-\varphi) - \frac{1}{2} \cos (\theta+\varphi)$ It is practical to perform operations on the quantity $\theta+\varphi$ and $\theta-\varphi$, thereby eliminating various multiplication steps which are more expensive to do electronically.

To obtain the quantity $\theta+\varphi$, the outputs 190 and 195 from the operational amplifiers 187 and 193 are delivered through a pair of conductors 197 and 198, respectively, to an operational amplifier 199 hooked up as an adder. The voltage at the output 200 from the operational amplifier 199 represents the quantity $\theta+\varphi$.

These same voltages 190 and 195 are delivered through another pair of conductors 202 and 203 to another operational amplifier 204 connected as a subtractor and having an output 205 representing the quantity $\theta-\varphi$.

The output 200 from the operational amplifier 199 is a constant DC voltage (during the generation of a straight bone) that is fed through a monostable delay multivibrator 207. The delay multivibrator 207 has another input 208 which is connected to the output of the first bistable multivibrator 18 on the output side of the master oscillator 10. Therefore, the input 208 to the delay multivibrator is a square wave synchronized with, but at one-half, the frequency of the output of the master oscillator 10.

The start of the square wave pulse at the input 208 flips the delay multivibrator 207 to its quasi-stable state. The duration of this quasi-stable state is determined by the DC voltage at the input 200 and is therefore determined by the magnitude of the quantity $\theta+\varphi$.

Since the input 208 is taken at the output of the first bistable multivibrator 18 which is one-half the frequency of the master oscillator 10, a single square wave pulse occurs at the input 208 during the period of two complete sine waves at the output of the master oscillator 10. Therefore, during this period of time, the sine wave output 14 from the master oscillator 10 goes through the cycle of representing the sine of the angles 0° through 360° twice. This multiple may vary if greater range is desired. The voltage in the conductor 200 representing the quantity $\theta+\varphi$ determines the duration that the monostable multivibrator 207 is in its quasi-stable state. The output 209 from the delay multivibrator is differentiated and clipped to produce a narrow pulse representing the change of state from quasi-stable to stable condition. When the multivibrator 207 flips back to its stable state, its output 209 which is connected to the input of a monostable multivibrator 210 causes the multivibrator 210 to generate an extremely narrow pulse at its output 211. This narrow pulse at the output 211 thus occurs at a time reference to the clock sine wave that is directly related to the magnitude of the quantity $\theta+\varphi$ put into the delay multivibrator 207.

The narrow-pulse-carrying conductor 211 is connected to open two sampler gates 214 and 215 for the very short period of time corresponding to the length of the narrow pulse. The input to the sampler gate 214 is the conductor 14 carrying the sine wave output from the master oscillator 10, and the input to the sampler gate 215 is the conductor 16 carrying the cosine wave output from the 90° phase shifter 15 on the output side of the master oscillator 10. Therefore, each time the narrow pulse occurs in the conductor 211, a small portion of the sine wave is sampled by the gate 214, and a small portion of the cosine wave is sampled by the gate 215. Since the sine and cosine waves 14 and 16, respectively, are synchronized with the square wave input 208 to the delay multivibrator 207, and the delay voltage 200 is proportional to $\theta+\varphi$, the sine and cosine waves sampled represent the sine and cosine, respectively, of the quantity $\theta+\varphi$.

The output conductor 216 from the sampler gate 214 delivers its voltage to a holding capacitor 217 and the output conductor 218 from the sampler gate 215 delivers its output to a holding capacitor 219.

The course of the voltage in the conductor 205 representing the quantity $\theta-\varphi$ will now be apparent. This voltage is delivered to a delay monostable multivibrator 222 having the same square wave input 208 that is the input to the previously discussed delay multivibrator 207. The magnitude of the voltage 205 representing the quantity $\theta-\varphi$ determines the duration of the unstable state of the delay multivibrator 222 and the output 223 from the delay multivibrator 222, which occurs when the multivibrator flips from its unstable state back to its stable state, triggers a narrow pulse generator 224. The narrow pulse output 225 from the multivibrator 224 opens a pair of sampler gates 226 and 227, the inputs to which are the sine wave 14 and the cosine wave 16 from the master oscillator 10. The quick sampling of these sine and cosine waves in the samplers 226 and 227 produces voltage outputs 228 and 229 representing the sine of $\theta-\varphi$ and the cosine of $\theta-\varphi$, respectively. These voltages are delivered to holding capacitors 230 and 231, respectively.

The equations set forth in the general theory of bone generation indicate that voltages representing the sine and cosine of $\theta$ and the sine and cosine of $\varphi$ are also needed. To obtain these voltages, a conductor 235 connected to the output 190 of the operational amplifier 187 carries the voltage representing the angle $\theta$ (or its 180° counterpart) to an operational amplifier 236, the output 237 of which is is fed to a delay monostable multivibrator 238. The input to the multivibrator 238 is the square wave input 208 which flips the multivibrator to its quasi-stable state, and the magnitude of the input voltage 237 determines the duration of the unstable state. The output 239 from the delay multivibrator 238 triggers a narrow pulse generator 240, the narrow pulse output 241 of which is fed to a pair of sampler gates 242 and 243. The input to the gate 242 is the sine wave 14 and the input to the gate 243 is the cosine wave 16. When the narrow pulse 241 opens the gates 242 and 243 they sample the sine and cosine waves and deliver their outputs 244 and 245 to holding capacitors 246 and 247, respectively. The voltages stored in these capacitors 246 and 247 represent the sine and cosine of the angle $\theta$.

The output voltage 195 from the operational amplifier 193 is carried by a conductor 250 to an operational amplifier 251, the output 252 of which is delivered to a delay monostable multivibrator 253. The multivibrator 253 has the square wave input 208 and has an output 254 occurring at a time determined by the magnitude of the DC input 252. The pulse 254 triggers a narrow pulse generator 255. The output 256 from the narrow pulse generator is delivered to a pair of sampler gates 257 and 258 one of which has the sine wave input 14 and the other of which has the cosine wave input 16. The output 259 from the sampler gate 257 is a voltage representing the sine $\phi$ and is delivered to a holding capacitor 260. The output 261 from the sampler gate 258 is a voltage representing the cosine $\phi$ and is delivered to a holding capacitor 262.

From the foregoing it is evident that the holding capacitors 217, 219, 230, 231, 246, 247, 260 and 262 store voltages representing the sine $(\theta+\phi)$, cosine $(\theta+\phi)$, sine $(\theta-\phi)$, cosine $(\theta-\phi)$, sine $\theta$, cosine $\theta$, sine $\phi$, and cosine $\phi$. These holding capacitors actually receive a number of sampled voltages each representing the appropriate sine or cosine function, because each sampler gate is opened a number of times during the generation of a bone. For example, the delay multivibrator 207 is flipped each time it receives a square wave input and therefore delivers successive narrow pulse outputs to the narrow pulse generator 210. The series of narrow straight sided pulses at the output of the generator 210 cause successive samplings of the sine and cosine waves in the sampler gates 214 and 215 with these sample voltages being delivered to the holding capacitors 217 and 219. Normally, these holding capacitors may receive about 15 to 20 sampled pulses during the generation of a bone.

There is a buffer amplifier 263 on the output side of each holding capacitor 217, 219, 230, 231, 246, 247, 260 and 262. The amplifiers 263 present a high output impedance to the holding capacitors, allowing the capacitors to hold accurate, unrippled, sampled voltages.

These sine and cosine functions could be generated in other ways. For example, the inputs to the $\theta$ gates 69, 77, etc., could be DC values previously resolved into sine-cosine values by potentiometers, requiring, however, another row of $\theta$ gates. Similarly the $\phi$ gates 70, 78 etc., could have sine and cosine inputs. Any appropriate sine-cosine function generator may be used.

Bone integrators

To get quantities representing the X, Y and Z components of a bone being drawn, there are an X integrator 265, a Y integrator 266, and a Z integrator 267 shown in FIGURE 1. The X integrator 265 comprises a high gain amplifier 268 with a feed back capacitor 269 connected across it. The Y integrator 266 comprises a high gain amplifier 270 with a feed back capacitor 271 connected across it. The Z integrator at 267 comprises a high gain amplifier 272 with a feed back capacitor 273 connected across it. The input to the X integrator 265 includes the voltage representing the quantity cos $(\theta+\phi)$ from the holding capacitor 219 through the amplifier 263 delivered by a conductor 275 through a resistor 276 to an input conductor 277; and a voltage representing the quantity cos $(\theta-\phi)$ from the holding capacitor 231 carried by a conductor 278 through a resistor 279 to the input conductor 277. The quantities cos $(\theta+\phi)$ and cos $(\theta-\phi)$ are halved and added by the resistors 276 and 279, and the sum is presented to the input 277 of the integrator 265. From the equations set forth in the general theory of bone generation, the trigonometric equivalent to this sum is the quantity cos $\theta$ cos $\phi$. Since the input 277 to the integrator 265 is a DC voltage, the output 280 from the integrator 265 is a ramp function representing the quantity $k_1 t$ cos $\theta$ cos $\phi$ wherein $k_1$ is a constant determined by the resistors 276 and 279 and the capacitor 269 and $t$ is the time variable. The charge on the feed back capacitor 269 determines the starting point of the ramp function $k_1 t$ cos $\theta$ cos $\phi$, which starting point will be coincident with the ending point of the previous output 280 so long as the capacitor 269 is not discharged. Thus, unless the capacitor 269 is discharged, successive bones are joined together end to end as they are drawn or generated.

The input to the Y integrator 266 includes the voltage representing the quantity sin $(\theta+\phi)$ delivered from the holding capacitor 217 by a conductor 285 through a resistor 286 to an input conductor 287 of the amplifier 270; and the voltage representing the quantity sin $(\theta-\phi)$ delivered from the holding capacitor 230 by a conductor 288 through a resistor 289 to the input conductor 287. Thus, the quantities sin $(\theta+\phi)$ and sin $(\theta-\phi)$ are halved and added together and presented to the integrator 266, but this input is equivalent to the quantity sin $\theta$ cos $\phi$. The ouput 290 from the integrator is a ramp function representing the quantity $k_1 t$ sin $\theta$ cos $\phi$. The starting point of the output 290 is determined by the presence or absence of a charge on the feed back capacitor 271.

The input to the Z integrator 267 is a voltage representing the quantity sin $\phi$ which is delivered from the holding capacitor 260 by a conductor 292 through a resistor 293 to the integrator amplifier 272. The output 294 from the integrator 267 is a ramp function representing the quantity $k_1 t \sin \phi$, and its starting point is determined by the charge on the capacitor 273.

Flyback network

As has been mentioned, the feed back capacitors 269, 271 and 273 associated with the integrator amplifiers 268, 270 and 272 determine the starting point of any bone being drawn, and as long as these capacitors are not discharged, the starting point of successive bones will occur at the ending point of the previous bone. However, when discharged, these capacitors establish the starting point of a bone at the so-called navel of a figure being drawn. For example, when the bones of an arm have been drawn it is obviously undesirable to have the leg bones begin at the tip of an arm. But, if the capacitors 269, 271 and 273 are discharged before the first of these leg bones is drawn, the first leg bone will start at the navel point. If this first leg bone is a placement bone drawn from the navel to the start of the leg of a figure (and blanked out in a manner to be described), then the remaining leg bones, which are successively connected end-to-end from the leg placement bone, will be properly positioned.

Thus, the flyback network, which is the network that discharges the capacitors 269, 271 and 273, is incorporated into the system. Another function of the flyback network is to assure that the starting point for each series of bones will be at a single point, the navel point, thereby obviating any slight deviations that might occur during the "out" and "in" scanning of a previous set of bones, such as the arm bones. Primarily, however, the flyback network is put into the system to eliminate the necessity of drawing a bone back to the starting point or navel point after a series of bones has been drawn.

The flyback network includes an electronic switch 300 connected across the capacitor 269, an electronic switch 301 connected across the capacitor 271, and an electronic switch 302 connected across the capacitor 273. These switches, 300, 301 and 302 are normally open. A pair of conductors 303 and 304, connected to the output of an amplifier 305, are connected in parallel to the switches 300, 301 and 302, and when these conductors 303 and 304 deliver a pulse to the switches 300, 301 and 302, the switches close for the duration of the pulse and discharge the capacitors 269, 271 and 273.

One source of pulses to the amplifier 305 is a flyback bistable multivibrator 306. This multivibrator 306 has an input conductor 307 connected to the output of the frame pulse multivibrator 23N which flips the multivibrator 306 to one state, delivering the voltage through the output 308 of a magnitude that will cause the switches 300, 301 and 302 to open.

Another input 309 to the bistable multivibrator 306 is connected to the output of the last storage counter to operate during any one frame and causes the multivibrator to flip to its second state to close the switches 300-302. This last storage counter would be the storage counter that draws the last bone of a figure. For example, assuming that the storage counters 46, 47, 48 and 49 are connected to draw the last bone of a figure, instead of the first bone as actually shown on the drawing, the input 309 to the flyback multivibrator 306 would be connected to the output of the storage counter 46 (not the storage counter 49 because the "in-out" multivibrator 120 causes the storage counters to flip successively in an "out" direction and then back in an "in" direction). This connection of the input 309 would be made to the conductor 142 at the output side of the "and" gate 133 to prevent triggering the multivibrator 306 during the "out" condition of the "in-out" multivibrator 120.

From the foregoing, it is evident that the flyback multivibrator 306 causes the capacitors 269, 271 and 273 to be discharged by closing the switches 300, 301 and 302 when the last storage counter counting off the length of the last bone of a figure being drawn has closed, and the scanning beam of the display cathode ray tube flys back to the zero or navel point. These switches 300, 301 and 302 remain closed until the multivibrator flips to its first condition at the time a pulse is transmitted to the input conductor 307, and this occurs when another frame pulse is generated at the output of the last bistable multivibrator 23N.

There are additional inputs 310, 311, 312, 313, 314 and 315 to the amplifier 305, each of which may be connected to the output of a selected storage counter 46 through 50N as flyback is needed. For example, following the drawing of the series of bones by the storage counters 46, 47, 48 and 49, and prior to drawing another series of bones starting with a group including the storage counter 50N, the capacitors 269, 271 and 273 should be discharged. Hence, one of the input connectors 310 through 315 is plugged into the conductor 142 on the output side of the "and" gate 133 to cause the display beam to fly back to the navel point prior to operation of the next group of storage counters.

The switches 300, 301 and 302 remain closed for the duration of any input pulse from the flyback multivibrator 306 or from the other inputs 310 through 315. All of the inputs 308, 310, 311, 312, 313, 314 and 315 to the amplifier 305 are connected through diodes 316 to prevent voltages from feeding back and disrupting the normal operation of the storage counters. Thus, with the plugs, as shown, flyback may be programed in a logical manner to conform to the structure of the figure or objects to be displayed.

What has been described thus far has led to the production of ramp functions at the outputs of the integrators 265, 266 and 267, which ramp functions represent the X, Y and Z components of bones for any figure to be drawn on the display tube. If nothing else were added to these ramp functions, they could be resolved into two dimensional quantities and transmitted to the horizontal and vertical deflection plates of the display tube to draw a complete stick figure. To bring the figure to life, however, voltages representing what may be called "skin" are added to these ramp functions.

Skin generator-skin scanning network—Horizontal deflection

Figure 6:
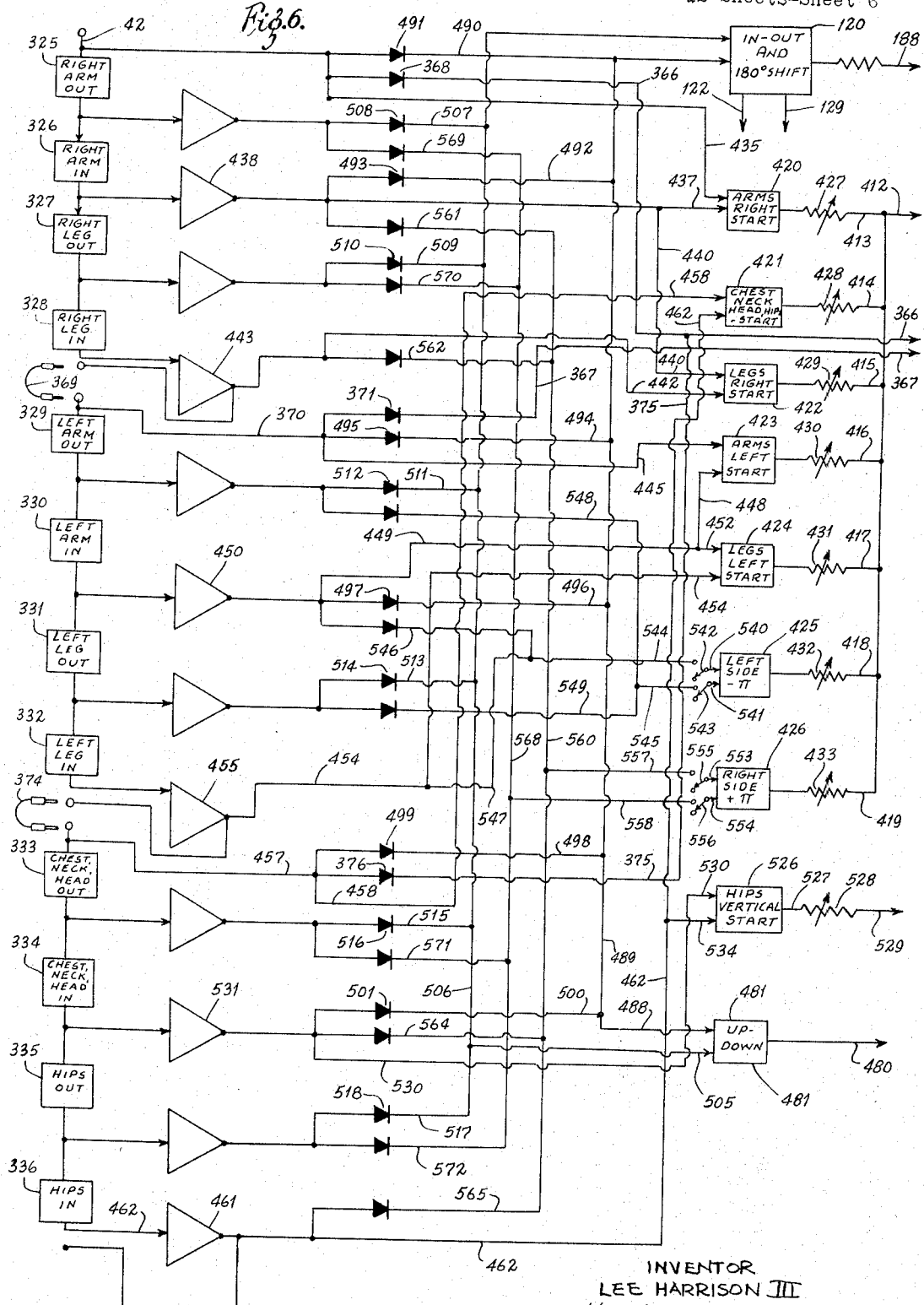

FIGURE 6 shows a group of blocks, 325, 326, 327, 328, 329, 330, 331, 332, 333, 334, 335 and 336, each representing a group of storage counters in the storage counter chain and all of the blocks 325-336 representing the groups of storage counters required to draw a typical figure. For example, the block 325 represents the arm step counters 46, 47, 48 and 49 for the "out" condition of the "in-out" bistable multivibrator 120. The block 326 represents the same storage counters but in the reverse order, 49, 48, 47 and 46 for the "in" condition of the multivibrator 120.

As indicated in thes blocks 325 and 326, one represents right arm out, and the other represents right arm in.

The other blocks represent other groups of bones required to draw the complete figure. The block 327 represents a group of step counters for right leg out, and the block 328 represents the same group of storage counters for right leg in. The block 329 is left arm out, the block 330 is left arm in, the block 331 is left leg out, the block 332 is left leg in, the block 333 is chest, neck and head out, the block 334 is chest, neck and head in, the block 335 is hips out, and the block 336 is hips in. These groups of step counters 325 through 336 are shown this way so that the programming for the scaner assembly 340 (FIGURE 7) may be illustrated.

The "in-out" multivibrator 120 is shown again for convenience in FIGURE 6.

Figure 7:
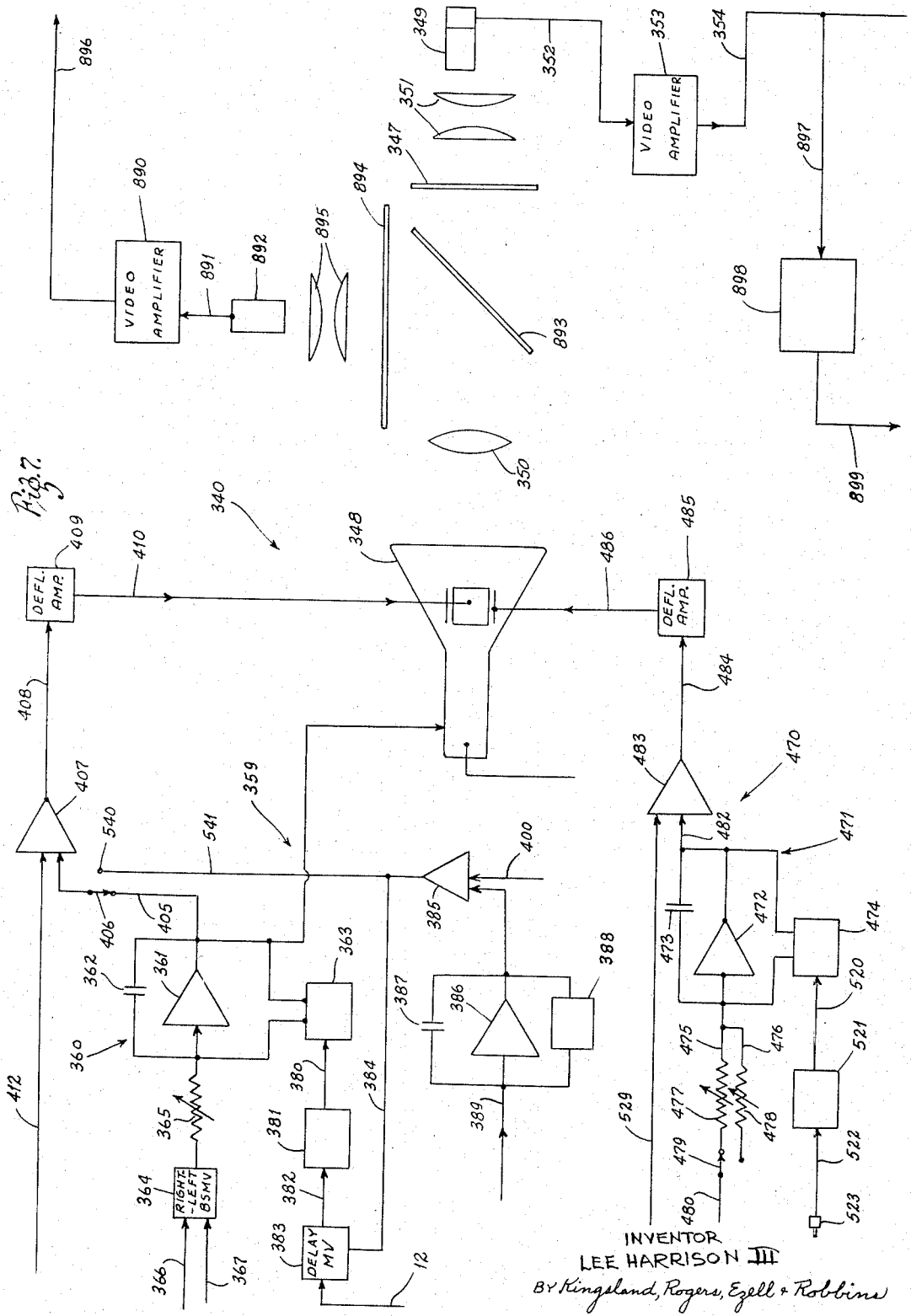
FIGURE 7 is a block and schematic diagram of the skin scanning network.

Recalling the geometric analysis of bone and skin generation, it will be remembered that the vector that generates the distance of skin surface from a bone was designated A. A scanner assembly 340 is provided as shown in FIGURE 7 and its purpose is to scan a film 341, shown in FIGURE 9, to obtain a varying voltage, the instantaneous value of which represents the magnitude of the vector A. Thus, the magnitude of the vector A may be continuously changing as the vector twirls around a bone, and the purpose of the scanner 340 is to produce an output voltage that varies in proportion to the changes in length of the vector A.

A typical film 341 to be scanned might be divided into sections 342, 343, 344 and 345 as shown in FIGURE 9. Each section is characterized by variations in density representing 360° or more of skin around the bones of various parts of a figure. These variations in density are proportional to the incremental lengths of the vector A for an arm in section 342, a leg in section 343, the chest, neck and head in section 344, and the hip in section 345.

Referring to FIGURE 7, the film 341 is placed in a film holder 347, positioned between a cathode ray tube 348 and a photomultiplier tube 349. There are appropriate lenses including an object lens 350 in front of the cathode ray tube 348, and condensing lenses 351 in front of the photomultiplier tube 349. When properly programmed, the beam of the cathode ray tube 348 scans the film 341 and varying intensities of the beam are focused through the condensing lenses 351 to the photomultiplier tube 349. The variations in intensity of the beam directed to the photomultiplier tube 349 are in proportion to the varying density of the material being scanned. The output 352 from the photomultiplier tube 349 is transmitted to a video amplifier 353 whose output 354 is a voltage varying in amplitude in proportion to the varying intensity of the beam focused on the photomultiplier tube 349.

To scan the entire film 341, the beam of the cathode ray tube 348 must be made to sweep in a horizontal direction and move in a vertical direction, or vice versa. In the example shown in the drawings, the beam is caused to sweep in a horizontal direction by a horizontal deflection generator 359 that includes a sawtooth generator 360. The sawtooth generator comprises an operational amplifier 361 with a capacitor 362 connected across it. A switch 363 is connected in parallel with the capacitor 362 to discharge the capacitor when the switch is closed.

The amplifier 361 has a positive or a negative D.C. voltage input generated by a right-left bistable multivibrator 364. The magnitude of this voltage is variable according to the setting of a potentiometer 365. The function of the bistable multivibrator 364 is to change the D.C. voltage from positive to negative or back to positive, according to whether the direction of the horizontal sweep should be from right to left or from left to right. The direction of the sweep is dictated by whether a right or left appendage is being drawn. This is important when drawing the arms or the legs because the film 341 contains only one arm section 342 and one leg section 343 used for both the right and left arms and legs of the figure. Therefore, when scanning the skin for the left arm, the scanner must scan in opposite direction that it scans when skin is being applied to the right arm. The same is true for the leg. On the other hand, it does not matter in which direction the scanning takes place for the single head, neck and chest, or for the single hips. However, this method is used to save film space. The film would have separate sections of variable density for each appendage of a figure, as in the case of "Captain Hook" or "Peg Leg Pete." The scanner would be programmed accordingly.

The bistable multivibrator 364 has two inputs, 366 and 367. As shown in FIGURE 6, one of these inputs, 366, is connected through a diode 368 to the conductor 42 which, in turn, is the input to the step counter group 325 for the right arm. Therefore, when a pulse is delivered to this storage counter group 325, the multivibrator 364 is caused to flip to its first condition, say a condition that generates a positive D.C. output. The multivibrator 364 remains in this first condition during the operation of the storage counter groups 325, 326, 327 and 328 because during this time, there is no voltage input through the conductor 367. However, when a voltage is transmitted through a conductor 369 from the storage counter group 328 to the first one of the storage counter group 329 to draw the left arm, a voltage is also transmitted through a conductor 370, a diode 371, and the conductor 367 to flip the multivibrator 364 to its second position. In this second condition, the output from the multivibrator 364 is a D.C. voltage of the opposite, or negative, polarity. The multivibrator 364 then remains in that condition during the period of operation of the storage counter groups 329, 330, 331 and 332.

The storage counter group 332 is connected to the group 333 by a conductor 374. This conductor 374 and the conductor 369 between the storage counter groups 328 and 329, are shown with releasable plug ends to indicate that changes can be made in the sequence of operation of the storage counter groups. Actually, the order of operation of these storage counters should ordinarily coincide with the positions of the bones, bones nearer the viewer being drawn before bones behind them.

Although the sweep of the cathode ray beam in the tube 348 may be in either horizontal direction when scanning the chest, neck and head and the hips, the connection 374 illustrated causes the sweep to be in the same direction as the sweep for the "right" storage counters 325, 326, 327 and 328 because there is a conductor 375 connected from the input 366 of the right-left multivibrator 364 through a diode 376 to the input side of the storage counter group 333. This conductor 375 delivers a pulse to the multivibrator 364 to flip the multivibrator back to its first or positive output condition when the storage counter group 333 receives a pulse.

The input to the sawtooth generator 360, which is always either a positive or a negative DC voltage of constant amplitude coming from the multivibrator 364, causes a gradual buildup of charge on the capacitor 362, thereby generating the sloping portion of the sawtooth wave, as is known in the art.

The switch 363 is normally open, but closes every time it receives a signal through its input 380. The input 380 is connected to the output of a bistable multivibrator 381, and the input 382 to the bistable multivibrator 381 is connected to the output of a delay monostable multivibrator 383.

The input to the delay multivibrator 383 is connected to the square wave output 12 from the master oscillator 10.

The beginning of each square wave pulse causes the delay multivibrator 383 to flip to its quasi-stable state. The input 382 to the bistable multivibrator 381 occurs at the time that the delay multivibrator flips back from its quasi-stable state to its stable state. Therefore, the time that the bistable multivibrator 381 changes its state depends upon the delay time of the delay multivibrator 383. This delay time is controlled by another input 384 to the delay multivibrator 383. The conductor 384 is connected through an adder 385 to the output side of an integrator that comprises an operational amplifier 386 with a capacitor 387 connected across it and a normally open switch 388 connected in parallel with the capacitor 387 to discharge the capacitor when the switch 388 is closed. The amplifier 386 has an input 389, and to understand the nature of that input, FIGURE 2 must be reexamined.

Returning to FIGURE 2 and referring particularly to the gates 71, 79, 87, 95 and 149N, these are $r$ gates wherein $r$ is a symbol representing the angular position of the skin about the bone. In other words, if a bone, like an arm bone, is turned, the value of $r$ changes.

These $r$ gates have variable inputs 390, 391, 392, 393 and 394N for establishing different voltage values according to the different values of $r$ for each bone. When the r gates are opened by their respective storage counters 46–50N, as has been described, these voltage values representing r are passed to the gate outputs 395, 396, 397, 398 and 399N, all of which are connected to a common conductor 400. This conductor 400 is connected directly to the adder 385. The input 389 to the operational amplifier 386 is connected to selective ones of the r gate outputs 395–399N to provide twist to arm appendages of the figure being drawn. Therefore, the input 384 to the delay multivibrator 383, which determines the delay time, or the period that the multivibrator is in its quasi-stable state, is proportional to the value of r sometimes added to the integrated value of r. It follows that the bistable multivibrator 381 is triggered by a pulse that occurs at a time related to the rotational position of the member being drawn.

Since the bistable multivibrator 381 flips from one state to the other each time the delay multivibrator 383 flips from its quasi-stable state to its stable state, the frequency of the square wave output 380 from the multivibrator 381 is one-half the frequency of the square wave input 12 to the delay multivibrator 383. Each time the multivibrator 381 flips to generate the relatively positive portion of a square wave, it opens the switch 363 and allows the sloping portion of the sawtooth wave to build up by the increase in charge on the capacitor 362. When the multivibrator 381 again flips to start the generation of the relatively negative portion of the wave, the switch 363 is closed to discharge the capacitor 362. Thus, the voltage from the r gates controls the time of horizontal sweep, that time being relative to the phase of the high frequency skin vector which generates the vector length A rotating at a constant rate around the bone.

The output 405 from the sawtooth generator 360 is connected through a switch 406 to a summation amplifier 407. The output 408 from the summation amplifier 407 is connected to a deflection amplifier 409 which has an output 410 connected to the horizontal deflection plates on the cathode ray tube 348.

*Program network for skin scanner—
Horizontal deflection*

The summation amplifier 407 has another input 412 that is connected to the outputs 413, 414, 415, 416, 417, 418 and 419, respectively, of a group of bistable multivibrators 420, 421, 422, 423, 424, 425, and 426 (see FIGURE 6). Each of these multivibrators 420 through 426 has a DC voltage output in one condition and a zero voltage output in the other condition. Thus the multivibrators operate as switches which are either on or off, depending upon the inputs to them. There are potentiometers 427, 428, 429, 430, 431, 432, and 433, respectively, on the output sides of the multivibrators 420 through 426 to provide adjustment of the output level. These multivibrators 420 through 426 are used to position the starting point of the scanning beam in a horizontal direction.

One input 435 to the bistable multivibrator 420 is connected to the conductor 42 on the input side of the right arm storage counter group 325. The pulse in this input 435 flips the multivibrator 420 to its switch-on condition to generate a DC voltage output. Assuming that the scanning beam sweeps from left to right when scanning for a right arm, the magnitude of the DC voltage output from the multivibrator 420, which is fed to the summation amplifier 407 through the conductor 412 and thence to the horizontal deflection plates of the cathode ray tube 348, is such as will position the scanning beam at a point 436 on the left side of the arm section 342 of the skin film 341.

The other input 437 to the multivibrator 420 is connected through a buffer amplifier cathode follower 438 to the output side of the storage counter group 326. Therefore, when the "right arm in" storage counters 326 have completed their sequence of operation, a pulse is transmitted to the input 437 to flip the multivibrator 420 to its switch-off condition, at which time no voltage is delivered to the output 413.

At the same time that the pulse is delivered through the input 437 to the multivibrator 420, a pulse is delivered through a conductor 440 to the "legs right" bistable multivibrator 422. This pulse flips the multivibrator 422 to its switch-on condition to generate a DC voltage in the output 415 that is transmitted through the conductor 412 to the summation amplifier 407. The magnitude of the output voltage from the multivibrator 422 is such as to position the starting point of the scanning beam at a point 441 on the left side of the leg section 343 of the skin film 341.

The other input 442 to the multivibrator 422 is connected through a cathode follower 443 to the output side of the leg-in storage counter group 328. When the storage counters in the group 328 have all operated in sequence, a pulse is delivered through the input 442 to flip the multivibrator 422 to its switch-off condition, at which time no voltage is delivered to the output 415.

When a pulse travels from the storage counter group 328 through the conductor 369 to the storage counter group 329, that pulse is transmitted through the conductor 370 to an input 445 to the bistable multivibrator 423. This pulse flips the multivibrator 423 to its switch-on condition to generate a voltage at the output 416. This DC voltage is transmitted through the summation amplifier 407 onto the horizontal deflection amplifier and thence to the plates of the cathode ray tube 348 to position the starting point of the scanning beam at a point 446 on the right side of the arm section 342 of the skin film 341. It will be recalled that at this same time the pulse is delivered from the conductor 370 to the input 367 of the bistable multivibrator 364 to flip it for a negative voltage generation to the sawtooth generator 360, thereby causing the scanning beam to sweep from right to left. Therefore, looking at the skin film 341 the beam starts at the point 446 and sweeps from right to left to scan the arm section 342 for a left arm.

The other input 448 to the multivibrator 423 is connected through a conductor 449 and through a cathode follower 450 to the output side of the left arm in storage counter group 330. When the "left arm in" group 330 has completed its sequential operation, a pulse is delieved to the input 448 of the multivibrator 423 to flip it to its switch-off condition. This same pulse is delivered through the conductor 449 to an input 452 of the "leg's left start" bistable multivibrator 424 and flips the multivibrator 424 to its switch-on condition. At this time a voltage is generated from the multivibrator 424 to its output 417 and through the conductor 412 to the summation amplifier 407 to position the scanning beam at a point 453 on the right side of the leg section 343 of the skin film 341. Since the sawtooth generator 360 is still scanning from right to left, the leg section 343 will be scanned from the point 453 in a right to left direction for a left leg.

The other input 454 to the multivibrator 424 is connected through a buffer amplifier or cathode follower 455 to the output side of the storage counter group 332 to flip the multivibrator 424 to its switch-off condition when the "left leg in" group of storage counters 332 have completed their sequence of operation.

When a pulse is delivered by the conductor 374 from the storage counter group 332 to the storage counter group 333, the pulse is also delivered through a conductor 457 to an input conductor 458 to the bistable multivibrator 421. This pulse flips the bistable multivibrator 421 to its switch-on condition to generate a DC voltage to the output 414 and thence through the summation amplifier 407 to position the starting point of the scanning beam at a point 459 on the left side of the head, neck and chest section 344 of the skin film 341. At this time, the multivibrator 364 on the input side of the sawtooth generator 360 has been flipped by an input through the conductor 375 to generate a positive DC voltage and the beam sweeps from left to right starting at the point 459. Since the hip section 345 on the skin film 341 is in the same horizontal position as the head, neck and chest section 344, the starting point 459 of the scanning beam remains constant throughout the operation of the storage counter groups 333, 334, 335 and 336. At the completion of operation of the storage counter group 336, a pulse is delivered through a cathode follower 461 to another input conductor 462 of the multivibrator 421 to flip the multivibrator to its switch-off condition.

*Skin scanner—Vertical deflection*

To move the scanning beam in a vertical direction, there is a vertical deflection generator 470 shown in FIGURE 7, comprising a sawtooth generator 471 having an operational amplifier 472 with a capacitor 473 and a switch 474 connected in parallel across the amplifier 472. There are alternate inputs 475 and 476 to the sawtooth generator 471, the input 475 including a variable resistor 477 and the input 476 including a variable resistor 478. A switch 479 permits alternate connection of a conductor 480 with the inputs 475 and 476.

The conductor 480 is connected to the output side of an up-down bistable multivibrator 481, shown in FIGURE 6. When the multivibrator 481 is in one condition, it generates a positive DC voltage and, in the other condition, it generates a negative DC voltage.

The output 482 from the sawtooth generator 471 is connected to a summation amplifier 483. The output 484 from the amplifier 483 is connected to a deflection amplifier 485, the output 486 of which establishes the potential on the vertical deflection plates of the cathode ray tube 348 to control the vertical position of the scanning beam. When the bistable multivibrator 481 is generating a positive DC voltage to put a positive charge on the capacitor 473, generating a positive-going sawtooth wave, the beam of the cathode ray tube 343 moves in an upward direction. When the output from the multivibrator 481 is a negative DC voltage, generating a negative-going sawtooth wave, the beam moves in a downward direction.

*Program network for skin scanner—Vertical deflection*

In connection with FIGURE 1, it has already been explained how the step counters for a given group of bones are first operated in an "out" sequence and then in an "in" sequence. It is therefore necessary that the skin scanning beam scan material that corresponds to the skin when moving out a series of bones and then scans the same skin as the bones are generated in a reverse direction.

One of the inputs 488 to the up-down bistable multivibrator 481 is connected to receive a pulse whenever the generation of a group of bones is in the "out" direction. Thus, the input 488 is connected to a conductor 489. The conductor 489 in turn is connected through a conductor 490 which leads through a diode 491 to the conductor 42 on the input side of the right arm storage counter group 325. Thus, whenever a pulse is transmitted to the right arm "out" storage counter group 325, the multivibrator 481 is flipped to generate a positive DC voltage which will cause the cathode ray beam to scan in an upward direction.

(It might be mentioned that the level of the DC voltage output from the multivibrator 481 as controlled by the variable resistor 477 is such as to cause the beam to move vertically at the same rate of speed as the rate of generation of the group of arm bones counted off by the group of storage counters 325.)

The conductor 489 (see FIGURE 6) is also connected through a conductor 492 and a diode 493 to the input side of the "right leg out" storage counter group 327; through a conductor 494 and a diode 495 to the input side of the "left arm out" storage counter group 329; through a conductor 496 and a diode 497 to the input side of the "left leg out" step counter group 331; through a conductor 498 and a diode 499 to the input side of the "chest, neck, head out" storage counter group 333; and through a conductor 500 and a diode 501 to the input side of the "hips out" storage counter group 335. Therefore, the triggering of any of these storage counter groups which generate bones in an "out" direction, causes the multivibrator 481 to generate a positive DC voltage and the sawtooth generator 471 to effect an upward sweep of the cathode ray beam.

The other input 505 to the multivibrator 481 flips the multivibrator to its other state in which condition it generates a negative DC voltage of the same amplitude as the positive DC voltage otherwise generated. In other words, the multivibrator 481 operates as an adder of 180° to reverse the direction of sweep. The input 505 is connected to a conductor 506. The conductor 506 is connected through a conductor 507 and a diode 508 to the input side of the "right arm in" storage counter group 326; through a conductor 509 and a diode 510 to the input side of the "right leg in" step counter group 328; through a conductor 511 and a diode 512 to the input side of the "left arm in" storage counter group 330; through a conductor 513 and a diode 514 to the input side of the "left leg in" storage counter group 332; through a conductor 515 and a diode 516 to the input side of the "chest," "neck, head in" storage counter group 334; and through a conductor 517 and a diode 518 to the "hips in" storage counter group 336. Accordingly, whenever a group of bones has been drawn in the "out" direction and the scanning beam has scanned upwardly to the top of the skin section being scanned, preparatory to operation of the same group of storage counters in the "in" direction, the bistable multivibrator 481 is flipped to generate a negative DC voltage. Thereafter, the scanning beam of the scanner 343 scans in a downward direction.

The switch 474 connected across the capacitor 473 of the sawtooth generator 471 has an input 520 connected to the output of an amplifier 521. The input 522 to the amplifier 521 has a plug 523 on it that convenienty is connected to the input to the flyback amplifier 305 (see FIGURE 1). Whenever there is a flyback pulse transmitted to the integrators 265, 266 and 267, a pulse is transmitted to the amplifier 521 to close the switch 474 and discharge the capacitor 473. This discharge of the capacitor 473 causes the scanning beam to flyback to its vertical starting position.

Since the hip section 345 on the skin film 341 is displaced vertically upwardly, there must be a vertical position control to position the starting point of the scanning beam when the hip section 345 is to be scanned. This vertical position control includes a bistable multivibrator 526 (FIGURE 6) having an output 527 connected through a variable resistor 528 to an input 529 to the summation amplifier 483. The multivibrator 526 has an input 530 connected through a cathode follower or buffer amplifier 531 to the input side of the "hips out" group of storage counters 335. When a pulse is delivered to start the "hips out" storage counters 335 operating, that pulse is delivered to the input 530 to flip the multivibrator 526 to a generating condition. In this condition, a DC voltage is generated the magnitude of which is regulated by the variable resistor 528. This voltage input to the deflection amplifier 485 is of proper magnitude to position the vertical starting point of the scanner beam at the lower edge 533 of the hips section 345 on the skin film 341.

The multivibrator 481 remains in its generating condition until a pulse is received in its other input 534. This input 534 is connected to the conductor 462 from the output side of the "hips in" group of storage counters 336. When the multivibrator 526 is flipped by a pulse in the input 534, its generation of a DC voltage terminates.

Skin scanner for figure outline

What has been described is what may be called Mode One scanning programming. In Mode One the entire skin film is scanned because the ultimate figure to be drawn is to be a complete figure with all of its skin or surface. There is also another programming condition for the skin scanning network which may be called Mode Two. The purpose of Mode Two programming is to cause the scanning beam to scan only an outline of the skin, but to scan that outline in sequence with the generation of bones. Operation of the system in Mode Two permits frame rate animation (e.g. 24 frames per second or more) with low bandwidth components which can handle full skin Mode Two information only at slow speeds. It should be understood, however, that by the use of more expensive high bandwidth components, provisions for Mode Two operation could be eliminated. The device as illustrated is in condition for a Mode One operation, and to change it to a condition for Mode Two operation certain switches must be operated.

In Mode Two operation, there is no horizontal scanning by the cathode ray tube 348 so the switch 406 on the output side of the sawtooth generator 360 is moved to break connection with the sawtooth generator output 405. This switch 406 is moved against a contact 540 which is connected by a conductor 541 to the output side of the operational amplifier 385. Accordingly, in Mode Two, the summation amplifier 407 receives a voltage directly from the adder 385 in proportion to the value of $r$. The amplifier 407 also receives an input from the conductor 412 generated by one of the multivibrators 420 through 424 to position the starting point of the scanning beam as has been described.

Also, for Mode Two operation, the switch 479 in the vertical deflection generator is moved from the input 475 to the input 476 of the sawtooth generator 471. The setting of the resistor 478 on the input 476 changes the speed of the vertical sweep of the scanning beam. Also (FIGURE 1), the bone-rate or rate of bone drawing is correspondingly changed for Mode changes by an appropriate selection of resistance at the inputs to the integrators 268, 270 and 272. (These resistors are not shown, but it will be understood that for each integrator 268, 270 and 272, a switch and appropriate resistor, like the switch 479 and the resistors 477 and 478 (FIGURE 7) could be provided.)

Now, with these connections, the bistable multivibrators 420 through 424 will determine the starting position of the beam in a horizontal direction with appropriate modification according to the $r$ input 400 to the amplifier 385. With no input to the summation amplifier 407 from the horizontal sweep sawtooth generator 360, the only motion of the beam (in scanning) is in a vertical direction except as dictated by twist generated by the integrator 385.

Thus, depending upon the sign (positive or negative) of the output 480 from the multivibrator 481, the beam would move upwardly and then downwardly with the downward motion taking place across the same area as the upward motion. To draw the complete outline of the skin for the group of bones, the beam is shifted 180° laterally when the bistable multivibrator 120 shifts to its "in" condition. This 180° shift is accomplished by the −180° and +180° bistable multivibrators 425 and 426 connected to the input side of the summation amplifier 407.

As shown in FIGURE 6, the −180° bistable multivibrator 425 has two inputs 540 and 541 connected to ganged switches 542 and 543. During Mode One operation, these switches are open, but for Mode Two operation they are moved into contact with a pair of conductors 544 and 545. In Mode One condition the bistable multivibrator 425 generates no voltage at its output 418, but when flipped to its other condition, the output is a DC voltage of a magnitude to shift the starting point of the scanning beam 180° to the left. Therefore, the multivibrator 425 is used for drawing the left arm and left leg outlines for which the normal starting points of the scanning beam on the skin film 341 are at the right side 446 of the arm section 342 and the right side 453 of the leg section 343.

The conductor 544 connected to the input 540 to the bistable multivibrator 425 is connected through a conductor 546 to the input side of the "left leg out" storage counter group 331 and through a conductor 547 to the conductor 454 on the output side of the "left leg in" storage counter group 332. A pulse in the input 540 establishes a no voltage output condition of the bistable multivibrator 425. The other input 541 to the bistable multivibrator 425 is connected through the conductor 545 to a conductor 548 on the input side of the "left arm in" storage counter group 330 and through a conductor 549 to the input side of the "left leg in" storage counter group 332. A pulse in the input 541 to the multivibrator 425 generates an output voltage 418 of a proper value to shift the scanning beam 180° to the left. Thus, since there are no connections from the "left arm out" storage counter group 329 to the multivibrator 425, the scanner beam moves upwardly across the arm section 342 of the skin film 341 according to the setting of other parameters already described. When a pulse reaches the "left arm in" storage counter group 330, that pulse is delivered through the conductor 548 to the input 541 of the multivibrator 425 to flip the multivibrator to its voltage generating condition. Thereafter, during the "in" counting of the left arm by the storage counter group 330, the scanning beam shifts laterally 180° to the left from the starting point 446 (FIGURE 9) and then moves downwardly.

This same sequence can be traced for the operation of the "left leg out" storage counter group 331 and the "left leg in" storage counter group 332. When the latter storage counter group 332 has completed its operation, a pulse is delivered through the conductor 454 and the conductor 547 to the input 540 to flip the multivibrator 425 to its no voltage output condition.

The +180° bistable multivibrator 426 has inputs 553 and 554 connected to a pair of ganged switches 555 and 556. These switches 555 and 556 are normally open for Mode One operation, but for Mode Two operation they are moved into contact with a pair of conductors 557 and 558.

The conductor 557 is connected to a conductor 560 that in turn is connected to a conductor 561 on the input side of the "right leg out" storage counter group 327; to a conductor 562 on the output side of the "right leg in" storage counter group 328; to a conductor 564 on the input side of the "hips out" storage counter group 335, and to a conductor 565 on the output side of the "hips in" storage counter group 336. The other input 554 to the multivibrator 426 is connected through the conductor 558 to a conductor 568. The conductor 568 is connected to a conductor 569 on the input side of the "right arm in" storage counter group 326, to a conductor 570 on the input side of the "right leg in" storage counter group 328, to a conductor 571 on the input side of the "chest," "neck, head in" storage counter group 334, and to a conductor 572 on the input side of the "hips in" storage counter group 336.

In tracing the various connections just described, it can be seen that, during the operation of the "right arm out" storage counter group 325, there is no input to the bistable multivibrator 426, and the beam scans in a vertical position dictated by the other controlling parameters on the horizontal deflection plates of the cathode ray tube 348. At the start of the operation of the "right arm in" storage counter group 326, a pulse is delivered through the conductor 569 to the conductor 568 and the input 554 of the multivibrator 426 to generate an output voltage 419 that will shift the scanning beam 180° to the right. Then at the start of operation of the "right leg out" storage counter group 327, a pulse is delivered through the conductor 561 and the conductor 560 to the input 553 to flip the multivibrator 426 back to its no voltage output condition. When the "right leg in" storage counter group 328 starts to operate, the multivibrator 426 is flipped to its voltage output condition for a 180° shift to the right and is thereafter flipped back to its no voltage output condition upon completion of operation of the "right leg in" storage counter group 328.

In the description of FIGURE 6, certain cathode followers 438, 443, etc. and diodes 491, 368, etc. have been mentioned. Others appear on the drawing to which no specific reference has been made. It should be understood that these components are used where necessary to stabilize back impedance and provide one way current flow as they are conventionally used. More or less of these components are used in this network to perform their obvious functions as required.

*Skin and bone combining network*

Going back now to FIGURE 3 and the sine and cosine function generator network, it will be recalled that the storage capacitors 217, 219, 230, 231, 246, 247, 260 and 262 are storing voltages sampled by the various sampler gates and representing the sine or cosine of various combinations of the angles $\theta$ and $\phi$. The quantities represented are indicated on FIGURE 3 opposite the relative storage capacitors. These voltage values are used as inputs to a network shown in FIGURE 4 for solving the equations set forth in the General Theory of Bone and Skin Generation.

The voltage representing the quantity $\sin(\theta+\phi)$ is delivered by a conductor 600 to a subtractor and booster comprising a pair of resistors 601 and 602 and an operational amplifier 603. Another conductor 604 transmits a voltage representing the quantity $\sin(\theta-\phi)$ from the capacitor 230 through a dividing resistor 605 to the amplifier 603. The resistors 601 and 605 divide the input quantities by two after which they are subtracted by the subtractor 603. Therefore, the output 606 from the subtractor 603 is a voltage representing the quantity $\frac{1}{2}[\sin(\theta+\phi)-\sin(\theta-\phi)]$ which is a trigonometric equivalent to the quantity $\cos\theta \sin\phi$.

A conductor 608 transmits the voltage representing the quantity $\cos(\theta+\phi)$ from the capacitor 219 through a dividing resistor 609 to a subtractor and booster 610. Another conductor 611 transmits the voltage representing the quantity $\cos(\theta-\phi)$ from the capacitor 231 through a dividing resistor 612 to the subtractor 610. The resistors 609 and 612 divide their input quantities by two following which they are subtracted in the subtractor 610. The output 613 is a voltage representing the quantity $\frac{1}{2}[\cos(\theta+\phi)-\cos(\theta-\phi)]$ which is trigonometrically equal to the quantity $\sin\theta \sin\phi$.

A conductor 616 transmits the voltage representing the quantity $\sin\theta$ from the capacitor 246 to an amplifier and booster 617, the output 618 of which is an amplified voltage representing the value $\sin\theta$. Another amplifier and booster 619 has its input 620 connected to the $\cos\theta$ capacitor 247, and its output 621 is an amplified voltage representing the quantity $\cos\theta$. Finally, a conductor 622 transmits the voltage representing the quantity $\cos\phi$ from the capacitor 262 to an amplifier and booster 623 having an output 624 representing the quantity $\cos\phi$.

The quantities $\sin k_2 t$ and $\cos k_2 t$ required in the equation set forth in Chart A are provided by a pair of transformers 630 and 631. The input 632 to the transformer 630 is connected to the output 14 of the master oscillator 10, which is a sine wave equivalent to $\sin k_2 t$. The transformer 630 has two outputs 633 and 634 one of which is a negative image of the other, or $+\sin k_2 t$ and $-\sin k_2 t$, for push-pull operation.

The input 635 to the transformer 631 is connected to the cosine wave output 16 from the master oscillator 10. This cosine is equivalent to $\cos k_2 t$. The transformer 631 also has two outputs 636 and 637 one of which represents $\cos k_2 t$ and the other of which represents $-\cos k_2 t$ (push-pull operation).

The outputs 633 and 634 from the transformer 630 are transmitted as low impedance inputs to a pair of multipliers 640 and 641. Another input 642 to the multiplier 640 is connected to the $\sin\theta$ output 618 from the amplifier 617. These quantities are multiplied by the multiplier 640 to produce an output 643 representing the quantity $\sin\theta \sin k_2 t$.

Another input 644 to the multiplier 641 is connected to the $\cos\theta$ output 621 from the amplifier 619. The inputs to the multiplier 641 are multiplied together to produce an output 645 representing the quantity $\cos\theta \sin k_2 t$.

The outputs 636 and 637 from the transformer 631 are transmitted as low impedance push-pull inputs to three multipliers 648, 649 and 650. Another input 651 to the multiplier 648 is connected to the $\cos\theta \sin\phi$ output 606 from the amplifier 603, and the output 652 from the multiplier 648 represents the quantity $\cos\theta \sin\phi \cos k_2 t$.

Another input 653 to the multiplier 649 is connected to the $\sin\theta \sin\phi$ output 613 from the amplifier 610. The output 654 from the multiplier 649 represents the quantity $\sin\theta \sin\phi \cos k_2 t$.

Another input 655 to the multiplier 650 is connected to the $\cos\phi$ output 624 from the amplifier 623. The output 656 from the multiplier 650 represents the quantity $\cos\phi \cos k_2 t$.

The output 643 from the multiplier 640 is transmitted through a switch 660 and a resistor 661 to an amplifier and booster 662. Another input to the amplifier 662 is the $\cos\theta \sin\phi \cos k_2 t$ output 652 from the multiplier 648 which is transmitted through a switch 663 and a resistor 664 to the amplifier 662. The resistor network associated with the amplifier 662 performs a subtraction of these quantities to produce an output 665 representing the quantity $\cos\theta \sin\phi \cos k_2 t - \sin\theta \sin k_2 t$.

The $\cos\theta \sin k_2 t$ output 645 from the multiplier 641 is transmitted through a switch 668 and a resistor 669 to an amplifier and booster 670. The $\sin\theta \sin\phi \cos k_2 t$ output 654 from the multiplier 649 is also delivered through a switch 671 and a resistor 672 to the amplifier 670. The resistor network associated with the amplifier 670 performs an addition of these input quantities to produce an output 673 representing the quantity $\sin\theta \sin\phi \cos k_2 t - \sin\theta \sin k_2 t$.

The $\cos\phi \cos k_2 t$ output 656 from the multiplier 650 is transmitted through a switch 675 to an amplifier 676 having an output 677 that still represents the quantity $\cos\phi \cos k_2 t$.

The outputs 665, 673 and 677 from the amplifiers 662, 670 and 676 are delivered as inputs respectively to three multipliers 680, 681 and 682. The other input to these multipliers 680, 681 and 682 is a variable voltage representing the variable quantity A. This variable voltage is fed from the output 349 of the video amplifier 348 through a resistor 683 to an adder 684. The output 685 from the adder 684 (which for Mode One represents $+A$, Mode Two being described later) is delivered as inputs 686, 687 and 688 to the multipliers 680, 681 and 682. Another adder 690 has its input 691 connected to the output from the adder 684. The adder 690 reverses the sign of its input so that its output 692 is the negative of its input or equivalent to $-A$ (in Mode One). The output 692 is delivered as inputs 693, 694 and 695 to the multipliers 680, 681 and 682.

The multiplier 680 multiplies its input 665 by the quantity A to produce an output 698 representing the quantity $A \cos\theta \sin\phi \cos k_2 t - A \sin\theta \sin k_2 t$. The multiplier 681 multiplies its input 673 by the quantity A to produce an output 699 representing the quantity $A \sin\theta \sin\phi \cos k_2 t - A \sin\theta \sin k_2 t$. The multiplier 682 multiplies its input 677 by the quantity A to produce an output 700 representing the quantity $A \cos\phi \cos k_2 t$.

Figure 5:
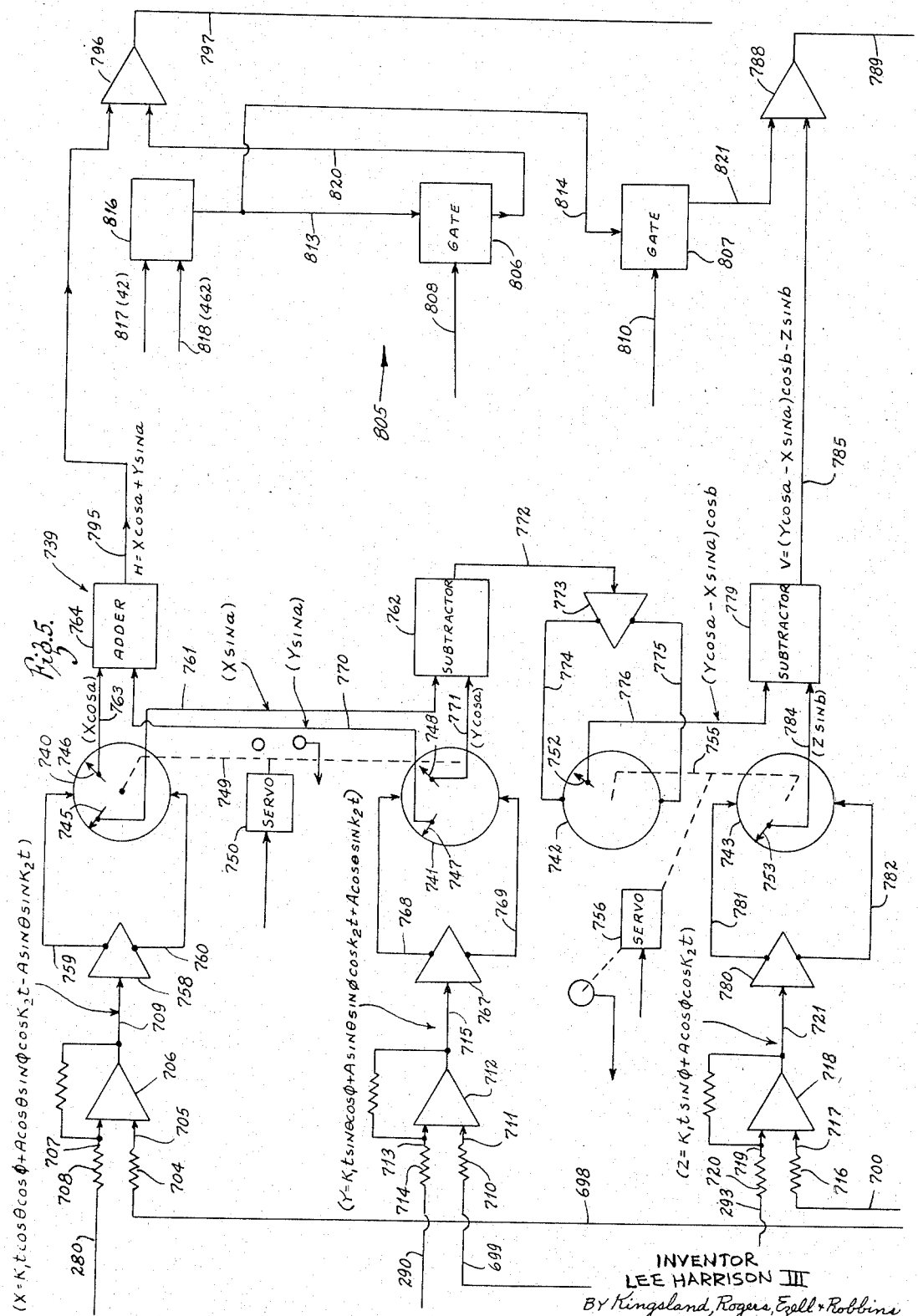

As shown in FIGURE 5, the output 698 from the multiplier 680 is connected through a resistor 704 to an input 705 of an operational amplifier 706. The other input 707 to the amplifier 706 is connected through a resistor 708 to the output 280 from the integrator 265. These input quantities are added by the resistor network 704 and 708 to produce an output 709 from the amplifier 706 representing the quantity X or $k_1 t \cos\theta \cos\phi + A \cos\theta \sin\phi \cos k_2 t - A \sin\theta \sin k_2 t$.

The output 699 from the multiplier 681 is transmitted through a resistor 710 to an input 711 of an operational amplifier 712. The other input 713 to the amplifier 712 is connected through a resistor 714 to the output 290 of the integrator 266. These input quantities are added by the resistor networks 710 and 714 to produce an output 715 representing the quantity $k_1 t \sin\theta \cos\phi + A \sin\theta \sin\phi \cos k_2 t + A \cos\theta \sin k_2 t$, and this quantity is equal to Y.

The output 700 from the multiplier 682 is connected through a resistor 716 to an input 717 of an operational amplifier 718. The other input 719 to the operational amplifier is connected through a resistor 720 to the output 293 of the integrator 267. These input quantities to the amplifier 718 are added by the resistor network 716 and 720 to produce an output 721 representing the quantity $k_1 t \sin\phi + A \cos\phi \cos k_2 t$, which is equal to Z.

Skin and bone combination—Mode Two

As shown, the quantities needed for the components X, Y and Z during operation in Mode Two are different from those described heretofore. To obtain the proper quantities for Mode Two operation, various switches must be operated. First of all, the switches 660, 668, 663, 671 and 675 (FIGURE 4) must be moved from their connections to the multiplier outputs 643, 645, 652, 654 and 656. The switches 660 and 668 are connected to ground contacts 722 and 723. The switch 663 is moved into contact with a conductor 725 that is connected to the output of the sin θ capacitor 246, the switch 671 is moved into contact with a conductor 726 that is connected to the cos θ capacitor output 247, and the switch 675 is moved into contact with the conductor 727 that is connected to the cos φ capacitor output 262.

Also, a switch 728 connected to the conductor 349 carrying the A voltages, which is open during Mode One operation, is closed into contact with an input 729 to a gate 730. The gate 730 has an input 731 connected to the "in" output 129 from the in-out multivibrator 120. When the multivibrator 120 is in its "out" condition, and the scanning beam of the cathode ray tube 348 is moving up the skin film 341, the gate 730 is closed and no signal passes through it. When the multivibrator 120 flips to its "in" condition, a voltage in the input 731 opens the gate 730. Termination of the signal in the input 731 again closes the gate.

When there is a signal in the input 731, the gate 730 reverses and doubles the quantity A and transmits this −2A output 733 to the adder 684. The output 685 from the adder 684 is therefore the sum of A (from the input 683) + (−2A) (from the input 733) which is equal to −A. This same output 685 when delivered to the input 691 to the operational amplifier 690 reverses the sign of A to provide an output 692 of +A. These quantities of −A and +A are delivered by the conductors 685 and 692 to the multipliers 680, 681 and 682.

In Mode Two the other input to the multiplier 680 is a voltage representing the quantity is θ transmitted from the conductor 725 through the switch 663, the subtractor 662 and the input 665. The other input to the multiplier 681 is a voltage representing the quantity cos θ transmitted through the conductor 726, the switch 671, the adder 670 and the input 673. The other input to the multiplier 682 is a voltage representing the quantity cos φ transmitted through the conductor 727, the switch 675, the amplifier 676 and the input 657. Thus, the output from the multiplier 680 transmitted to the adder 706 is a voltage representing the quantity $A \sin\theta$ and the output from the adder 706 represents the X component for Mode Two operation or $k_1 t \cos\theta \cos\phi \mp A \sin\theta$. The output from the multiplier 681 delivered to the added 712 is a voltage representing the quantity $A \cos\theta$ and the output from the adder 712 represents the Y components for Mode Two operation or $k_1 t \sin\theta \cos\phi + A \cos\theta$. The output from the multiplier 682 transmitted to the adder 718 is a voltage representing the quantity $A \cos\phi$, and the output from the adder 718 is a voltage representing the Z component or $k_1 t \sin\phi + A \cos\phi$. The quantity cos φ for Mode Two operation will be zero for normal operation in that mode as explained in the general theory of bone and skin generation. Therefore the Z component is $k_1 t \sin\phi$.

Resolution from three to two Dimensions—Camera angle network

The components X, Y and Z which position the figure in three dimensions must be resolved into two components H—for horizontal and V—for vertical, for the two dimensional display tube. This resolution of components is accomplished in a camera angle network 739, illustrated in FIGURE 5, that includes a group of sine-cosine potentiometers or resolvers 740, 741, 742 and 743. The potentiometer 740 has a pair of contact members 745 and 746 connected together at a 90° angle to generate sine and cosine values, respectively, of inputs to the potentiometer 740. The potentiometer 741 has a pair of contacts 747 and 748 to generate sine and cosine functions, respectively, of the inputs to the potentiometer 740. The potentiometer 741 has a pair of contacts 747 and 748 to generate sine and cosine functions, respectively, of the inputs to the potentiometer 741. The potentiometers 740 and 741 are ganged together on a common shaft 749 which is rotated by a servomechanism 750. Alternatively, the shaft 749 may be hand operated.

The sine-cosine potentiometer 742 has a single contact member 752 to generate the cosine of the input to the potentiometer 742. The potentiometer 743 has a contact member 753 to generate the sine of the input to the potentiometer 743. The potentiometers 742 and 743 are controlled by a common shaft 755 which is controlled by a servomechanism 756 or by a conventional hand control.

The output 709 from the amplifier 706, representing the X component, is transmitted to an inverter 758 having positive and negative outputs 759 and 760 which are connected as inputs to the potentiometer 740. These positive and negative X inputs are provided so that the sine and cosine contacts 745 and 746 can generate all sine and cosine outputs from +1 to −1. One of these outputs 761 is a voltage representing $X \sin a$ and is connected to a subtractor 762. The other output 763 is a voltage representing $X \cos a$ and is delivered to an adder 764.

The Y output 715 from the amplifier 712 is connected to an inverter 767 having outputs 768 and 769 representing plus Y and minus Y, the output conductors 768 and 769 being connected to the potentiometer 741. This potentiometer 741 has an output 770 representing the quantity $Y \sin a$ which is connected to the adder 764 and an output 771 representing the quantity $Y \cos a$ which is connected to the subtractor 762.

The output 772 from the subtractor 762 is a voltage representing the quantity $Y \cos a - X \sin a$. This output conductor 772 is connected to an inverter amplifier 773 which has two output conductors 774 and 775 representing the positive and negative components of the input 772. These conductors 774, and 775 are connected as inputs to the potentiometer 742 which has an output 776 representing the quantity $(Y \cos a - X \sin a) \cos b$. The conductor 776 is connected to a subtractor 779.

The Z output conductor 721 is connected to an inverter amplifier 780 which has a plus Z output conductor 781 and a minus Z output conductor 782. These conductors 781 and 782 are connected to the potentiometer 743 which has an output conductor 784 representing the quantity Z sin b. This conductor 784 is also connected to the subtractor 779. The subtractor 779 subtracts the input 784 from the input 776 to produce an output 785 representing the quantity (Y cos a—X sin a) cos b—Z sin b, which as reference to the equations in the preceding Theory of Camera Angle Network shows, represents the vertical component V of the beam on the display tube. This conductor 785 is connected into an adder 788, the output 789 from which is connected to the input 790 of the horizontal and vertical deflection amplifiers 791 (FIGURE 8) an output 792 from which controls the vertical deflection of the display beam of the display tube 11.

The output 795 from the adder 764 represents the quantity X cos a+Y sin a. This output conductor 795 provides an input to an adder 796, the output 797 of which is connected to an input 798 of the horizontal and vertical deflection amplifier 791. An output 799 from the horizontal deflection amplifier is connected to the horizontal deflection plates of the display tube.

It is evident from the foregoing description that the H and V components transmitted to the deflection plates of the display tube depend upon the setting of the sine-cosine potentiometers 740–743. These H and V components will, of course, vary with changes in the X, Y and Z inputs 709, 715, and 721, but any viewing angle directed toward the three dimensional X, Y, Z figure may be selected by varying the setting of the potentiometers 740–743.

Gross position network

What has been described are the various mechanisms involved in producing voltage variations on the horizontal and vertical deflection plates of the display tube to draw a complete figure and to animate that figure, but the figure drawn and animated is otherwise stationary on the display tube. To provide controls for causing the figure to move across the display scope, there is a gross position network 805.

The gross position network 805 comprises a pair of gates 806 and 807. The gate 806 has a variable DC input 808, the voltage value of which may be regulated by a hand controlled potentiometer (not shown) or by previously recorded control signals. The gate 807 has an input 810 which also may be regulated by a hand controlled potentiometer (not shown) or by previously recorded control signals.

The gates 806 and 807 have additional inputs 813 and 814, respectively, which are connected to the output of a bistable multivibrator 816. The multivibrator 816 has an input 817 connected to the input side 42 of the first step counter of the group 325 and an input 818 connected to the output 462 of the last storage counter of the last group 336 representing one complete figure. The input 817 flips the multivibrator 816 to a condition that opens the gates 806 and 807, and the input 818 flips the multivibrator 816 to close these gates.

The gate 806 has an output 820 that delivers the input control voltage to the adder 796 when the gate 806 is open. This voltage is added to the voltage input delivered by the conductor 795, adding a gross position to the horizontal deflection plates of the display tube 11. The gate 807 has an output 821 that delivers the input control voltage to the adder 788 when the gate 807 is open. This voltage is added to the voltage supplied by the conductor 785 to provide a gross position voltage to the vertical deflection plates of the display tube 11.

Overlap prevention network

There is an overlap prevention network 845, shown in FIGURE 8, to prevent the overlap drawing of parts of the body where other parts have already been drawn. The overlap prevention network 845 comprises a vidicon tube, or similar functioning storage tube 846, that has a photo-conductive layer 847 against which the light from a flash tube 848 is directed. The flash tube 848 has an input 849 connected to the output 29N from the frame pulse bistable multivibrator 23N so that the photoconductive layer 847 is charged by the flash tube 848 at the beginning of the drawing of each frame. The vidicon tube 846 has a signal electrode output 850 that carries a voltage whenever the vidicon scanning beam scans virgin territory on the photoconductive layer 847. There is much less output voltage when the beam scans areas that have been previously scanned.

A pair of conductors 851 and 852 are connected to the horizontal and vertical deflection voltage carrying conductors 797 and 789, respectively, which control the position of the display beam. Therefore, the conductors 851 and 852 carry the same voltages that produce deflections in the display tube 11. These conductors 851 and 852 are connected to the inputs 853 and 854 of the horizontal and vertical deflection amplifiers for the vidicon tube, thereby causing the vidicon tube 846 to scan in a manner exactly parallel to the movement of the beam of the display tube 11.

The output conductor 850 from the vidicon tube 846 is connected to an amplifier and clipper 855, the output 856 of which is connected through a switch 857 to an "and" gate 858. The "and" gate 858 has another input 859 that delivers a voltage when the information being delivered to the display tube actually represents something that should be drawn. For example, placement bones are not to be drawn nor are bones (normally) to be drawn when the step counters are counting off in the "out" direction.

The input 859 may conveniently be connected to an "and" gate 860 that has one input 862 connected to the outputs 864, 865, 866, 867 and 868N, respectively, of the gates 72, 80, 88, 96 and 150N associated with the storage counter chain. These gates may be used for intensity variation with hand controlled variable DC inputs 870, 871, 872, 873 and 874N for varying the voltage passed by these gates according to the desired intensity of the display beam. For a placement bone, the intensity setting for the gate associated with the placement bone can be set for no voltage output.

The "and" gate 860 has another input 878 connected to the "in" output conductor 129 of the in-out bistable multivibrator 120. Thus, when the "and" gate 860 receives a voltage from the intensity gates through the input 862 as well as from the conductor 878, it transmits voltage to the "and" gate 858. If, at the time this voltage is received by the gate 858, there is a voltage in the input from the vidicon tube 846, the "and" gate delivers an output 880 to a blanking grid on the display tube to turn the beam on whenever there is a voltage in the conductor 880. Similarly, the blanking grid blanks the display beam when there is no output from the "and" gate 858. To accommodate those instances when it is desired to draw during the "out" condition of the system, another input 883 to the "and" gate 860 may be provided. This input 883 is connected to the "out" conductor 122 of the in-out bistable multivibrator 120. A switch 884 is provided to allow selection between the inputs 878 and 883.

The other position of the switch 857 puts it in contact with an input conductor 881 to a bistable multivibrator 882. This connection is made for Mode Two operation, and its function will be described hereinafter.

When the display beam is blanked out because the subject drawn involves a placement bone or because the storage counters are operating in an "out" sequence instead of an "in" sequence, it would be undesirable to have the vidicon tube scan the photoconductive layer 847 and prevent later display of the same area by the display tube. Consequently there is a conductor 885 connected from the conductor 859 to a blanking grid on the vidicon tube 846. When there is no signal in the conductor 885, the beam of the vidicon tube 846 is turned off. Therefore, a voltage in the conductor 885 is present when the necessary conditions for vidicon scanning (drawing) are met, and the vidicon beam is turned on. Similarly, no voltage in the conductor 885 indicates the conditions for drawing have not been met and the vidicon beam is turned off.

Intensity modulation

To cause the beam of the display tube 11 to make drawings having minute details on them and to introduce shading into the drawing, there may be various ways to modify the intensity of the display beam. The intensity modulation is done regardless of the state of animation of the figure and regardless of the positions of the different bones. For full intensity modulation, as shown in FIGURE 7, there is a video amplifier 890 connected to the output 891 of a photomultiplier tube 892. The photomultiplier tube 892 is positioned at right angles to the skin scanning cathode ray tube 348. A 45° 30–30 mirror 893 is positioned between the film holder 347 and the object lens 350 to direct half the scanning beam upwardly toward the photomultiplier tube 892. Between the photomultiplier tube 892 and the mirror 893 there is a film holder 894 for receiving variable density film on which the density variation corresponds to desired variations in the intensity of the figure being drawn. The density variations on this intensity film are positioned according to the sweep of the scanning beam of the cathode ray tube 348 so as to synchronize with the ultimate drawing of the figure by the display tube 11. The beam scans the film in the holder 894 and whatever intensity of the beam there is passing through the film is directed past some condensing lenses 895 to the photomultiplier tube 892. The video amplifier 890 has an output 896 that is connected to an intensity modulation control on the display tube. Since the scanning beam of the tube 348 is synchronized with the generation of a given bone to provide three-dimensional skin for that bone, and the density variations on the intensity film in the film holder 894 correspond to the minute details of all points on the surface of the skin for that bone sequentially with generation of that skin, this density variation may modulate the signal output from the video amplifier 890, regardless of the and $\phi$ settings for that and regardless of whether or not the bone is undergoing animation.

There are ways to provide a shading effect by other intensity controls. For example, the output 354 from the video amplifier 353, which has voltages varying with variations in the skin vector A, may be delivered by a conductor 897 to a differentiator 898. The differentiated output from the differentiator 898 is delivered by a conductor 899 to a summation amplifier 900 (FIGURE 8) having an output conductor 901 connected to a video amplifier 902. The output 903 from the video amplifier is connected to a conductor 904 which is connected to a control on the display tube for modulating the intensity of the display beam.

Still another way to modulate the intensity of the display beam is to connect a conductor 907 (see FIGURE 8) to the sine wave output 14 of the master oscillator 10 and deliver this sine wave through a variable resistor 908 to a variable phase shifter 909. The output 910 from the phase shifter may be fed into the summation amplifier 900 for combination with the differentiated "A" voltage or it may be fed directly to the intensity modulation input 904 to the display tube. The variable phase shifter 909 allows modulation of the beam intensity at any point or points of the sine wave input to provide variations from light to dark of the display beam.

Background network

Background information is supplied by a background network 915 that includes a high resolution scanning image orthicon or other scanning device 916. The scanning device 916 scans a film 917 through an optic lens 918. The film 917 has density variations corresponding to the design of the background. The scanning device 916 has a straight line raster that sweeps in a regular rectangular path according to the output from a conventional horizontal and vertical sweep sawtooth generator 919. The sawtooth generator 919 is started by an input pulse from a conductor 920 that is connected to the output from the last storage counter of the storage counter chain 336. Therefore, background information is not scanned until everything else has been drawn.

The sawtooth generator has output voltages 921 and 922 which are delivered to the horizontal and vertical deflection amplifiers 923, the outputs 924 and 925 of which are connected to the horizontal and vertical deflection plates of the scanning device 916.

The output from the sawtooth generator 919 is also directed to the vidicon tube 846 to cause it to sweep parallel to the background scanner 916 to produce blanking whenever the sweep covers areas over which drawings have already been made. These same outputs 921 and 922 are also connected through the conductors 851 and 852 to the deflection amplifiers 791 of the display tube 11.

The scanning device 916 has a video output 927 that is transmitted to a video amplifier 928. The output 929 from the video amplifier is transmitted to the intensity modulation input 904 to the display tube 11. Drawing of the background, therefore, occurs by modulation of the intensity of the display beam as it sweeps the same path as the background scanning device 916, the display beam being turned off every time the vidicon tube 846 indicates any overlap.

Recording network

The system has basic variables that have thus far been described as being manually controlled. There are, of course, many variables in the over-all system, including the variable DC inputs 57–61N to the storage counters 46–50N to determine the lengths of bones, the variable DC inputs 160–164N and 173–177N to the $\theta$ and $\phi$ gates to provide animated motion to the figure being displayed, the variable DC inputs 390–394N and 870–874N to the $r$ and $i$ gates to accommodate rotation and twist of different appendages and to modulate intensity, variable DC inputs to the servo controls 750 and 755 that regulate the camera angle network and variable DC inputs to the gates 806 and 807 in the gross position network.

That these controls can be varied manually is desirable because an operator is thereby enabled to create figures and to animate them. But it is highly desirable that at least the motion parameters be somehow recorded and that the recording system permit changes in the motion of any single appendage or part of an appendage of a figure without affecting the rest of the recording. Consequently, this system has a recording network that can record any of the variables in the system and is especially useful in recording the motion parameters, including the inputs to the $\theta$, $\phi$, $r$ and $i$ gates.

Figure 21:
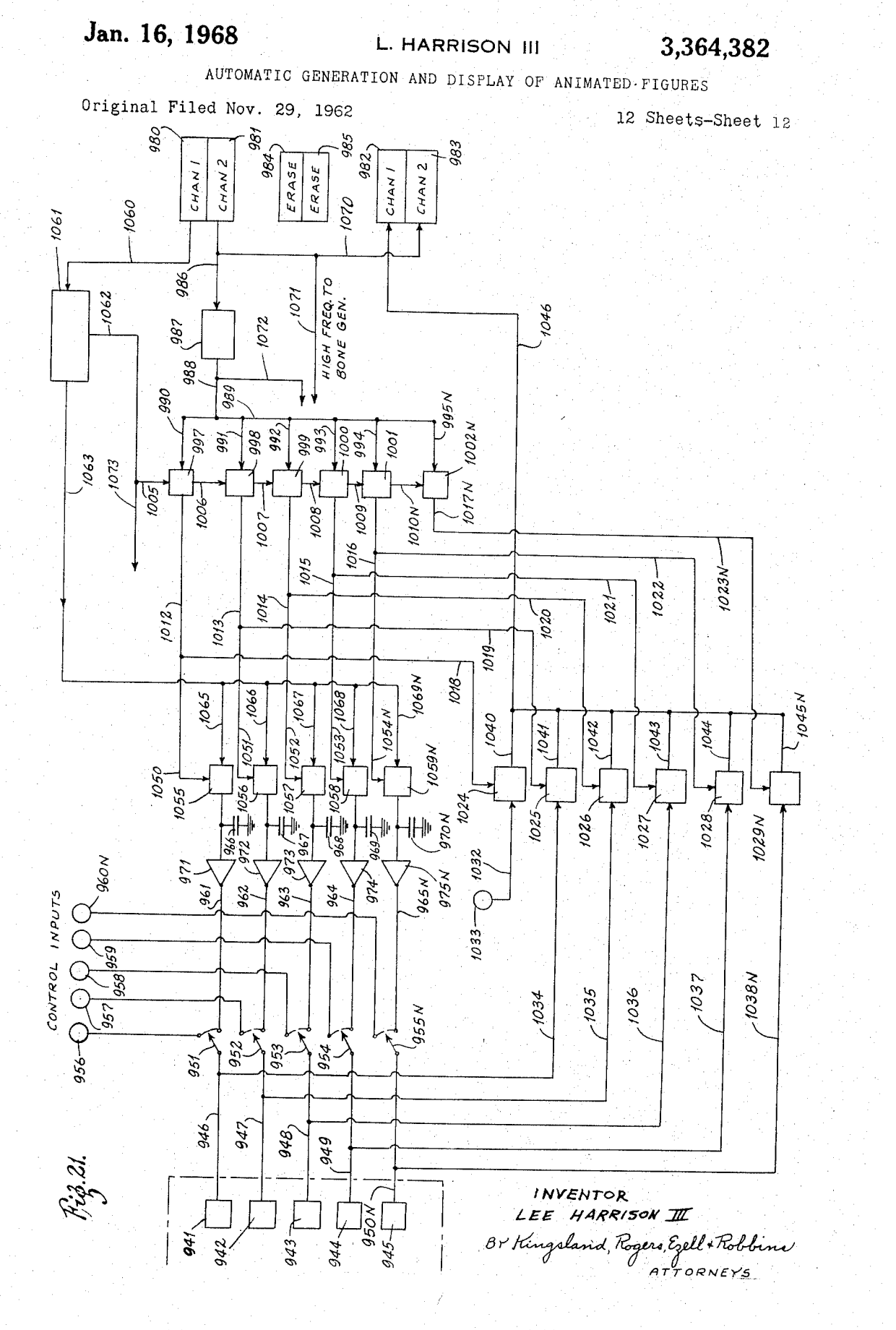

The recording network is shown in FIGURE 21. A bank of gates 941–945N are associated with the bone generator network of FIGURE 1. These gates 941–945N are representative of any of the motion parameter gates, such as the $\theta$ gates 69, 77, 85, 93 and 147N.

The parameter gates 941–945N have inputs 946, 947, 948, 949 and 950N that are respectively connected through switches 951, 952, 953, 954 and 955N to a series of manually controllable inputs 956, 957, 958, 959 and 960N. These inputs 956–960N may be conventional potentiometers to provide a variable DC level input to the gates 941–945N. If the gates 941–945N correspond to the $\theta$ gates in the bone generator network, the variable inputs 956–960N correspond to the $\theta$ gate inputs 160–164N. When the switches 951–955N connect the variable inputs 956–960N to the gates 941–945N, the control is as was described in connection with FIGURE 2.

The switches 951–955N can be moved out of contact with the manually controlled inputs 956–960N and into contact with a plurality of conductors 961, 962, 963, 964 and 965N. These conductors are connected to the outputs of a plurality of holding capacitors 966, 967, 968, 969 and 970N. If necessary, buffer amplifiers 971, 972, 973, 974 and 975N or similar devices, may be connected on the output sides of the holding capacitors. The holding capacitors 966–970N store DC voltages the magnitude of which represent the parameter inputs to the gates 941–945N. These voltages on the holding capacitors are supplied by a tape and de-multiplexing system to be described.

In the present description, the recorder has two channels including two read or playback heads 980 and 981, two write or record heads 982 and 983, and two erase heads 984 and 985. The tape moves across these heads moving first across the read heads 980 and 981, followed by the erase heads, and last the write heads 982 and 983. Channel two of the tape corresponding to the read head 981 and the write head 983 carries the sine wave generated by the master oscillator 10. Therefore, an output conductor 986 from the read head 981 continuously carries a sine wave. This conductor 986 delivers the sine wave to a square wave generator 987 that generates a square wave output 988 in phase with the sine wave 986.

The square wave output 988 is delivered through a common conductor 989 as individual inputs 990, 991, 992, 993, 994 and 995N to a bank of gates 997, 998, 999, 1000, 1001 and 1002N. These gates 997–1002N open in series when triggered and are set to remain open for equal lengths of time during the counting of a specific number of square wave pulses.

The gate 997 has an input 1005 that delivers a triggering pulse to open the gate 997. With a fully recorded tape, this triggering pulse or frame pulse is delivered automatically to the input 1005 as will be described. Initially, however, some other conventional means must be used to transmit a very narrow trigger pulse to the input 1005. As a matter of convenience, this frame pulse may constitute the frame pulse output from the multivibrator 23N (FIGURE 1).

The gate 997 delivers an output pulse 1006 to open the gate 998 at the time the gate 997 closes. There are similar output conductors 1007, 1008, 1009 and 1010N between the rest of the gates so that the gates operate in series.

The gates 997–1002N have outputs 1012, 1013, 1014, 1015, 1016 and 1017N, and a plurality of conductors 1018, 1019, 1020, 1021, 1022 and 1023N deliver pulses from these outputs to a bank of multiplexing gates 1024, 1025, 1026, 1027, 1028 and 1029N. Therefore, the gates 1024–1029N are opened in sequence as the gates 997–1002N are opened.

The gate 1024 has an input 1032 connected to a generator 1033 for generating a low level narrow pulse DC voltage below the range of the parameter voltages. The other gates 1025–1029N have input conductors 1034, 1035, 1036, 1037 and 1038N. These conductors 1034–1038N are connected to the input conductors 946–950N leading to the parameter gates 941–945N. Therefore, any control signals that are transmitted to the parameter gates are also transmitted to the multiplexing gates 1025–1029N. These signals are passed by the gates 1025–1029N to their outputs 1041, 1042, 1043, 1044 and 1045N. As these gates are opened in sequence with the opening of the gates 998–1002N these outputs are transmitted by a common conductor to the Channel one write head 982 for recording.

The output conductors 1012–1016 from the gates 997–1001 are also connected as trigger inputs 1050, 1051, 1052, 1053 and 1054N to a bank of demultiplexing gates 1055, 1056, 1057, 1058 and 1059N. The other inputs to the gates 1055–1059N originate from the channel one read head 980 that has an output conductor 1060 leading to a pulse separator 1061. The pulse separator 1061 has an output 1062 that delivers the low level narrow frame or trigger pulse to the input 1005 to the gate 997. The pulse separator 1061 has another output conductor 1063 that transmits the series of DC parameter voltages as inputs 1065, 1066, 1067, 1068 and 1069N to the demultiplexing gates 1055–1059N. When the demultiplexing gates 1055–1059N are opened in series by the gates 997–1001, they pass the recorded DC voltages to the storage capacitors 966–970N for ultimate use by the bone generator.

A conductor 1070 connected from the sine wave read head 981 to the channel two write head 983 causes continuous recording of the sine wave (unless the speed of the tape keeps the sine wave synchronized with the recording of parameter voltages making rerecording unnecessary). Another conductor 1071 makes the recorded sine wave available to the bone generator, and a conductor 1072 makes the square wave available to the bone generator, both for use in lieu of the sine and square waves generated by the clock 10. Still another conductor 1073 makes the frame pulse available to the storage counter 46 of the bone generator.

*Operation*

At times during the preceding description of this invention, distinctions have been made between various connections for Mode One operation and Mode Two operation. In Mode One operation, the picture drawn on the display tube has all of the skin that would ultimately appear on the picture to be photographed or displayed, such as illustrated in FIGURE 19. For Mode Two operation, the only skin added to the bones is a skin outline. The reason that the system incorporates provisions for Mode Two operation, or operation with only an outline of the skin, is to allow the machine to operate at full animation rate, for example, 24 frames per second, even though the bandwidth capacity of some of the components of the system makes them incapable of operating at such a rate. FIGURE 20 illustrates a Mode Two drawing corresponding to the man shown in FIGURE 19. Since in Mode One operation all of the components of the system are doing what they normally do to draw a completed picture on the display scope, this description of operation will begin with Mode One under manual control. (The operation with recording appears hereinafter.)

Before Mode One operation begins, various switches are set in the Mode One positions. In the skin scanner network, these switches include the switches 542, 543, 555 and 556 on the input sides of the −180° and +180° bistable multivibrators 425 and 426 (see FIGURE 6). These switches are moved out of contact with their associated input conductors to disconnect the bistable multivibrators 425 and 426. At the input to the summation amplifier 407 (FIGURE 7) leading to the horizontal deflection amplifier 409, the switch 406 is moved to the Mode One position in contact with the output of the sawtooth generator 360 to make the skin scanning cathode ray tube 348 scan in its full rectangular sweep. The switch 479 on the input side to the sawtooth generator 471 controlling the vertical deflection plates of the scanning tube 348 is moved to the Mode One position to connect in the resistor 477 providing proper velocity for the vertical sweep of the scanning beam.

In the vector combination network (FIGURE 4), the switches 660, 668, 663, 671 and 675 are moved to their More One positions, and the switch 728 is moved to its Mode One position. These switches connect in the proper conductors carrying voltages representing those geometric quantities necessary to solve the equations set forth in The General Theory of Bone and Skin Generation.

The other switches that are set in the Mode One positions are the switches associated with the overlap prevention network 845 (FIGURE 8).

To operate the device, the clock or master oscillator 10 is started. Thereafter, the clock 10 continues to generate square wave, sine wave and cosine wave outputs 12, 14 and 16, respectively. The square wave output 12 is transmitted to the series of bistable multivibrators 18–23N which successively step down the frequency of the square wave.

The output 29N from the last bistable multivibrator 23N is transmitted as a trigger pulse to the series of storage counters 46–50N. There are as many storage counters as there are bones in the one or more figures in a given picture to be drawn. These storage counters may be thought of as arranged in groups 325–336, as illustrated in FIGURE 6. Each of the groups 325–336 represents a connected series of bones for a member of the body, such as the bones for an arm, the bones for a leg, etc.

Removable plugs 369 and 374 between certain ones of these storage counter groups permit selective connection of the order in which the storage counters are to be operated. Although the drawing illustrates only such storage counter groups as are required for a single figure, it should be understood that the output from the last storage counter group 36 may be connected to another series of groups associated with another figure. It should also be understood that these storage counters may be used to draw the skeletons of objects other than animal figures because the programmed information to be added to the storage counter outputs is infinitely variable.

FIGURE 2 illustrates a series of storage counters 46, 47, 48 and 49 comprising a group for generating a series of connected bones. These storage counters represent the right arm storage counter groups 325 and 326. The trigger pulse from the bistable multivibrator 23N fires the first storage counter 46 and then the next storage counters 47–49 in succession, after which the storage counter 49 is again operated, followed by the storage counter 48, the storage counter 47, and the storage counter 46. This sequence of operation is established by the in-out bistable multivibrator 120 as has already been described in detail. (The arrangement of gates to operate the storage counters "in" or "out" is a very convenient way to avoid additional storage counters, but the same operation could be achieved, at greater expense, with storage counters for the "out" condition and separate storage counters for the "in" condition.)

Each storage counter 46–49, once triggered, counts off pulses, the number of which is determined by the variable inputs 57, 58, 59 and 60. The number of pulses counted by each storage counter represents the length of a bone. The pulses counted are those fed from the output of one of the bistable multivibrators 18–23N. Thus, the variable inputs 57–60 determine the length of time that the storage counters remain open or that the storage counters count pulses; and the length of each bone is a function of time and of the frequency of the output from the particular bistable multivibrator to which the storage counter is connected. The output from any one of these storage counters thus determines the length of a bone, such as the bone L in FIGURE 15.

The angles theta and phi which position the bone with respect to the three-dimensional axes X, Y and Z, as indicated in FIGURE 15, are established by a series of gates connected to the outputs of the storage counters. For example, a theta gate 69 and a phi gate 70 are connected to the output from the storage counter 46. Other theta and phi gates are connected to the outputs from the other storage counters.

The theta and phi gates 69 and 70 are opened for the duration that the storage counter 46 is counting pulses. These gates have variable DC inputs 160 and 173, respectively, that can be set for any desired values of the angles theta and phi. While the gates are open, these DC voltages are passed through the gates to a sine-cosine function generator illustrated in FIGURE 3.

The purpose of the sine-cosine function generator is to develop DC voltages representing the sine and cosine of various combinations of the angles theta and phi. These quantities are developed and stored in a group of storage capacitors 217, 219, 230, 231, 246, 247, 260 and 262.

Various ones of these DC voltages are combined and integrated by an integrator network illustrated in FIGURE 1, and comprising the integrators 265, 266 and 267. The outputs 280, 290 and 294 from these integrators represent, respectively, the components X, Y and Z for the bone that is being counted off by any given storage counter 46–50N. These outputs 280, 290 and 294 are ramp functions that vary linearly with time according to the length of the bone.

Successive bones are connected together end to end so long as the capacitors 269, 271 and 273 associated with the integrators 265, 266 and 267 are not discharged. For example, the bone generated by the storage counter 47 starts with the end of the bone generated by the storage counter 46, although the angular position of the second bone is independently determined by its theta and phi gates 77 and 78. Of course, it is not the bones themselves that are drawn, but rather the skin on the bone, the positions of the bones merely providing reference lines for the skin vector A.

The connections between successive bones can be interrupted if the capacitors 269, 271 and 273 are discharged. Discharge of these capacitors occurs according to the programming of a flyback network that includes normally open switches 300, 301 and 302 across the capacitors. These switches are closed whenever there is a pulse output from a flyback bistable multivibrator 306, and such a pulse does occur following the operation of the last storage counter drawing the last bone in a single display frame. There are also the selective connections 310–315 that permit programming of flyback at various points during the display of the figure. The purpose of this selective programming is to provide flyback of the display beam to the navel or starting point after the last display bone of one bone group has been drawn, to thereby establish that starting point for the first bone of a succeeding bone group.

To add skin to the bones, various equations are solved to produce X, Y and Z components of the magnitude and position of the skin vector A. These equations are indicated in the section on General Theory of Bone and Skin Generation. The equations are solved by the network illustrated in FIGURE 4.

Figure 4:
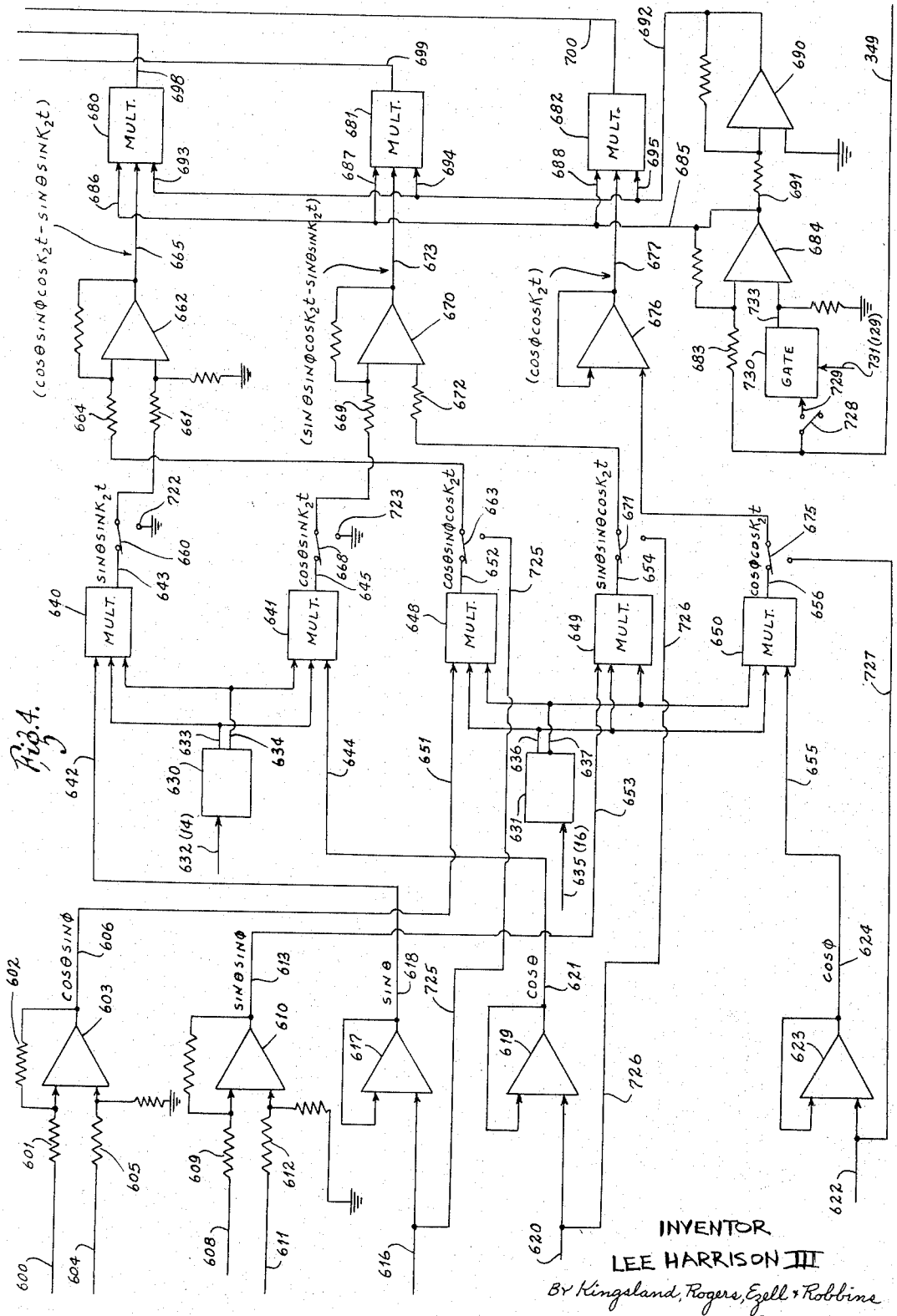

As any bone is being counted out by its storage counter, such as the storage counter 46, the sine and cosine functions of the various combinations of theta and phi are being stored in the storage capacitors 217, 219, 230, 231, 246, 247, 260 and 262, and the required ones of these stored DC voltages are being transmitted to the network illustrated in FIGURE 4. At the same time, additional inputs to the network of FIGURE 4 include the sine wave 14 from the master oscillator which is equivalent to sin $k_2 t$ and the cosine wave 16 which is equivalent to cos $k_2 t$. These sine and cosine waves are transmitted as inputs 632 and 635 to a pair of transformers 630 and 631. These several inputs are combined in various ways to produce geometric quantities 665, 673 and 677 that can be multiplied by the vector A to give the X, Y and Z components of the vector A.

The magnitude of the skin vector A is dependent upon the output from the skin scanning network 340, illustrated in FIGURE 7. In the skin scanning network 340, a skin film 341, as illustrated in FIGURE 9, is scanned by the beam of the scanning tube 348. This scanning beam is programmed to scan parts of the film 341 that correspond not only to the particular bone being drawn but to the rate at which that bone is drawn. The beam is programmed to scan upwardly across a section of the skin film when the operation of the bone storage counters corresponding to that skin film section is in an "out" direction, and to scan downwardly across the same section when those storage counters are operated in an "in" direction. The programming also positions the starting point of the scanning beam, the rate at which the scanning beam sweeps horizontally across the film, and the rate at which the scanning beam moves vertically across the film. All of this programming assures that the magnitude of the vector A at any given time is the proper value corresponding to the point of the relative bone that is being drawn at that time and corresponding to the angular position of the skin vector A as it twirls around the bone.

The magnitude of the vector A is synchronized with the angular position of the vector A by the operation of the switch 363 in the horizontal deflection sawtooth generator 360 which is set to cause the beam to make one complete horizontal sweep during the period of the master oscillator 10. This horizontal sweep occurs as a charge build-up on the capacitor 362, and the capacitor 362 is discharged when the switch 363 closes. When the capacitor 362 is discharged, the scanning beam flies back to its starting point, except that it continues to move vertically according to the vertical deflection sawtooth generator 471.

The closing of the switch 363 is controlled by the square wave output 12 from the master oscillator, the frequency of which is halved by the multivibrator 381. Accordingly, the capacitor 362 remains discharged for a complete period of the master oscillator output. This extended discharge time prevents desynchronization of the horizontal sweep with the angular position of the vector A which would occur otherwise as a result of the flyback time for the scanning beam.

Since the switch 363 is reopened according to the square wave input 12 from the master oscillator 10, the start of the horizontal sweep is always synchronized with the angular position of the vector A that in turn is dictated by the sine and cosine outputs 14 and 16 from the master oscillator.

The vertical movement of the skin scanning beam is synchronized with the rate that the relative bone is drawn by the proper DC voltage input 475 to the horizontal sweep sawtooth generator 471. The magnitude of this input voltage 475 is determined by the operating input 488 or 505 to the up-down bistable multivibrator 481, and these inputs 488 and 505 are connected to the input to the bone storage counter being drawn. In addition, the up-down bistable multivibrator 481 causes the beam to move up or down according to which input 488 or 505 carries a pulse. As has already been described, the input 488 is connected to appropriate points in the storage counter chain to generate a positive DC voltage output when the storage counters are operated in an "out" direction. Connections of the input 505 to points in the storage counter chain produce a negative DC voltage output during "in" drawing of the bone.

Whenever the generation of bones in connected sequence is interrupted by the flyback network, the switch 474 on the vertical deflection sawtooth generator 471 is closed to discharge the capacitor 473 and cause the skin scanning beam to flyback to its vertical starting position. The switch 474 is controlled by an input 522 to an amplifier 521, the input 522 being programmed with the flyback network illustrated in FIGURE 1.

In addition to the foregoing, the programming network illustrated in FIGURE 6 provides appropriate positioning voltage inputs 412 and 529 to the horizontal and vertical deflection amplifiers 409 and 485, respectively, as has already been described in detail.

The variable voltages representing the skin vector A are transmitted through the conductor 354 from the skin scanning network 340 to the equation solving network illustrated in FIGURE 4. There the vector A is resolved into positive and negative components which are transmitted as inputs to the multipliers 680, 681 and 682. The other inputs to these multipliers are voltages representing the angular factor by which the vector A must be multiplied to produce its X, Y and Z components. The combination in the adder amplifiers 706, 712 and 718 (FIGURE 5) of the outputs 698, 699 and 700 from the multipliers with the outputs 280, 290 and 293 representing the X, Y and Z components of the bone being drawn produces the X, Y and Z components of the total figure. These X, Y and Z components are the three-dimensional quantities that are always available as information to the camera angle network 739.

The camera angle network generates a two-dimensional output that is related to the three-dimensional figure according to the angle from which the figure is viewed. Here, reference may be made to the earlier section on Theory of Camera Angle Network. That discussion, and its reference to FIGURES 16, 17 and 18, shows how rotation of the three-dimensional reference axes X, Y and Z through angles $a$ and $b$ allows viewing of the figure from every possible angle.

The camera angle network 739 performs these rotations through the angles $a$ and $b$ and solves the equations set forth in the section on camera angle network theory to produce two outputs H and V, the magnitudes of which, when transmitted through the horizontal and vertical deflection plates of the display tube 11, determine the position of the display beam.

The H and V component outputs 795 and 785 vary as the figure displayed is animated. Animation is accomplished by simply varying the variable inputs to the theta and phi gates connected to the outputs from the storage counters. As the values of theta and phi vary with the drawings made in successive frames, the positions of the bones are varied.

Animation also often involves variation of the variable inputs 390–394N to the $r$ gates 71, 79, 87, 95, and 149N. These gates produce a gross rotation of the skin about their respective bones as is necessary when a bone, such as a head bone or an arm bone, rotates relative to the other bones in its group. The outputs from these $r$ gates are fed through the conductor 400 to the skin scanning network 349 to provide an additional control over the starting point of the horizontal sweep deflection generator 359.

Additional controls over the position of the beam of the display tube 11 are provided by the gross position network 805 (FIGURE 5). This network 805 does not effect the values of the H and V components 795 and 785, and therefore, does not effect the basic animation motion of the figure being drawn. The purpose of the gross position network 805 is to allow the entire figure to move horizontally and vertically across the display tube.

In the gross position network 805, DC voltages 808 and 810 are fed into two gates 806 and 807. The magnitude of the voltage 808 determines the gross position of the figure in a horizontal direction, and the magnitude of the voltage 810 determines the gross position of the figure in a vertical direction.

The gates 806 and 807 are opened by the output from the storage counters 46–50N and transmit their DC voltage inputs 808 and 810 to the horizontal and vertical deflection plates of the display tube 11 when the gates 806 and 807 are opened by the bistable multivibrator 816. The multivibrator 816 opens these gates 806 and 807 for the duration of operation of all the storage counters 46–50N.

Overlap is prevented by the overlap prevention network 845 (FIGURE 8). The scanning beam of the vidicon tube 846 is made to scan in parallel with the beam of the display tube 11 because the inputs to the deflection amplifiers 791 for the tube 11 are also transmitted to the deflection amplifiers for the vidicon tube 846. Whenever the scanning beam of the vidicon tube 846 moves across an area that has already been drawn, there is no signal in the output 850 that ultimately leads to the input 880 to the blanking grid of the display tube 11; and the display beam is blanked out.

The blanking grid input 880 is also influenced by the "in-out" bistable multivibrator 120 and by the intensity gates 72, 80, 88, 96 and 150N connected to the storage counter outputs. When the "in-out" bistable multivibrator 120 indicates that the storage counters are being operated in a direction for which there should be no display, or when there is no output from the intensity gate associated with the bone being drawn, the beam is blanked out. When blanking is caused by either of these latter two conditions, the beam of the vidicon tube 846 is also blanked out so that it will not continue to scan while the display beam is off.

After all of the figures have been drawn on the display tube, the background is added. Addition of the background is under the control of the horizontal and vertical sweep sawtooth generators 919 that cause a scanner 916 to scan a background film 917 by a conventional rectangular raster sweeping motion. These same horizontal and vertical sweep sawtooth generators 919 cause the beam of the display tube 11 and the beam of the vidicon tube 846 to sweep parallel to the scanner 916. As the beam of the display tube 11 sweeps, its intensity is modulated by the output 927 from the scanner 916, which output varies with the intensity on the background film 917. At the same time, the vidicon tube 846 blanks out the display beam whenever the area being scanned has already been drawn.

The operation which has just been described is for Mode One operation. With low bandwidth components, operation in Mode One must take place at a slower speed than the normal frame rate. This slower speed is permissible because a camera photographing the picture on the display tube 11 can also be operated at slower than frame speed, and then when the camera is speeded up to the normal frame rate, the pictures on the film will be projected at a rate that produces the normal animation desired.

To enable an operator to produce animation on the display tube 11 at frame rate speed, operation in Mode Two is provided. This Mode Two operation permits preliminary animation of characters on the display tube 11 permitting the operator to vary the animation inputs as he watches the figure.

For Mode Two operation, the various switches that were switched to positions for Mode One operation are moved into their other positions for Mode Two operation. In Mode Two operation, generation of the bones occurs in the same way as for Mode One operation, but the X, Y and Z components of the vector A added to the components for the bone represent only an outline of the skin.

To provide the skin outline, the horizontal sawtooth generator 360 in the skin scanning network 340 is disconnected and the only horizontal movement of the beam that occurs depends upon the positioning of the starting point for scanning to the input 412 to the summation amplifier 407. (This positioning of the starting point is unchanged from Mode One operation.) Thereafter, the horizontal position of the scanning beam is affected only by the input 400 from the r gates 71, 79, 87, 95 and 149N and by the outputs from the −180° and +180° bistable multivibrators 425 and 426.

The vertical sweep sawtooth generator 471 causes the beam to move vertically upwardly as the storage counters operate in an "out" direction and move vertically downwardly as the storage counters operate in an "in" direction. Between the "out" and "in" operations of the storage counter, the multivibrators 425 and 426 shift the scanning beam 180° to the right or to the left depending upon whether the bones being drawn are on the right side or the left side of the figure.

For Mode Two operation, the switch 857 (FIGURE 8) is moved into contact with the input to the bistable multivibrator 882. Under these circumstances, the vidicon tube 846 flips the bistable multivibrator 882 to blank out the display beam when the vidicon tube scanning beam crosses an outline of skin and then when the beam crosses the outline of skin on the other side of the bone, the bistable multivibrator 882 is again flipped to turn the display beam back on.

The combination of the vector A with the various geometric quantities generated by the network in FIGURE 4 occurs in the multipliers 680, 681 and 682, and the outputs from these multipliers are combined with the X, Y and Z components of the bone to produce X, Y and Z components for the figure outline. The operation of the camera angle network upon beams X, Y and Z components is the same as it was for Mode One operation.

*Operation with recording*

For purposes of description, it may be supposed that the device is being used to generate an animated sequence. A sine wave of desirable frequency has been previously recorded on channel two of the tape (corresponding to read head 981 and write head 983). The operation of channel two is thereafter automatic. The sine wave is transduced into a voltage signal by the read head 981, fed into the square wave generator 987 where the square pulses are used by the timing section storage counters 997–1002N as a time base for their action. The sine wave is also sent through the conductor 1070 and re-recorded through the channel two write head 983 in phase with the actions of the multiplexing gates 1024–1029N. If the distance between the read and the write heads is such that the re-recorded sine wave signal is in phase with the previously recorded (or upstream) signal, then re-recording is unnecessary.

To illustrate the operation, reference may be made to recording the actions of one bone in terms of the θ angle as controlled by the variable input 956. The switch 951 is placed in its recording position, e.g., it connects the conductor 946 to the control input 956. The DC voltage output of the control is then presented to the gate 941, and the variations in voltage cause the angular position of that particular bone to vary as would be evident on the display. At the same time, this control voltage is being presented to the input 1034 of the multiplexing gate 1025 where it is sampled in its turn as the gates 1024–1029N are fired (opened) in the sequential order as prescribed by the timing section outputs 1018–1023N. One "sample" of the voltage in conductor 1014 is taken for each frame. During the time that the multiplexing gate 1025 is held open, the control DC voltage 956 is delivered through the conductor 1046 to the channel one write head 982, where is is recorded on magnetic tape as an analogue of the voltage.

The gate 1025 was held open by its control input 1019 in the sequence and for a time determined by the operation of the storage counter 998. The fixed time of duration of the counter output 1013 is determined by an intrinsic network which counts a fixed number of high frequency pulses delivered to it from the square wave generator 987. The time of opening is determined by the time the storage counter 998 receives a firing pulse from the previous counter 997, which pulse is generated upon the closing of that counter 997. Thus it can be seen that the sequential order of firing of the counter chain 997–1001 causes the outputs of the multiplexing gates 1024–1092N each to be recorded for a period of time, and in a sequence determined by the timing section, that sequence being initiated by and thus synchronized with the input frame pulse delivered to the timing section by the conductor 1062 coming from the pulse separator 1061.

Examination of FIGURE 21 shows, therefore, that prior to the recording of the output of gate 1025 the output of gate 1024 has been recorded in analogue fashion on the tape. The input 1032 to this gate 1024 is a DC voltage which is below the normal range of control voltages being presented to the other gates 1025–1029N of the multiplexing section. It is therefore the recorded output of the gate 1024 that will be used as a synchronizing frame pulse on playback of the recording tape.

After manipulating the control input 956 in the desired manner for the desired time over a number of frames, the operator of the device is now ready to play back the tape and either view again the actions which he has just recorded or manipulate another parameter (control) input, such as the control 957, while viewing the previously recorded action. As will be shown, the previously recorded actions of the "run through" just described will be performed automatically on the viewing display.

This animation by manipulation of the controls may be done at any display frame rate because one or more controls may be manipulated for any degree of animation and recording, followed by playback of the recorded information and superposition of additional signals from manipulation of different controls.

The tape is rewound to its starting point. The switch 951 is positioned to the "playback" position to connect the conductors 946 and 961. If it is desired to record the actions for the parameter gate 942, the switch 952 is put into recording position, connecting the output of the control 957 to the conductor 947. The operation of the circuits associated with the switch 952 is exactly the same as previously described for the input to the parameter gate 941, except that the sampling that occurs through the multiplexing gate 1026 of the multiplexing section occurs immediately after the sampling through the gate 1025. As the tape passes the read head 980, the voltages previously recorded by the channel one write head 982 are transduced into a series voltage signal which is carried by the conductor 1060 to the pulse separator 1061. The pulse separator clips off the frame pulse previously recorded through the gate 1024 and transmits the remaining portion of the series voltage signal to the conductor 1063 which makes this signal available to the de-multiplexing gates 1055–1059N. The frame pulse, having been separated from the rest of the signal in the pulse separator 1061, is sent through the conductor 1062 to the input 1005 of the first counter 997, causing that counter to fire at such time as the DC signal previously recorded from the multiplexing gate 1025 is present in the conductor 1063. When the counter 997 fires, an operating voltage is sent through the conductor 1012 to the gate 1055 causing the gate 1055 to open, thus allowing the voltage present in the conductor 1063 to be passed to the holding capacitor 966. The holding capacitor 966 holds the DC voltage thus presented until such time as a new voltage is presented to it during the following a frame. This DC voltage is available during an entire frame to the gate 941 and to the conductor 1034 for re-recording, changing its value once each frame.

It is not desirable to have the actual moment of change of a DC parameter voltage occur at the time when that voltage is being used either in the bone generator 941 or for re-recording. Therefore, the sequence of record-playback is staggered, e.g., while the storage counter 998 opens the gate 1056 for playback of the second parameter voltage, it opens the gate 1025 for recording of the first parameter voltage.

It may be generally noted that the high frequency signals availabel in the conductors 986 and 988 are the same high frequency sine and square waves as required by the device throughout its entirety and that the frame pulse available in the conductor 1062 may also be used in the device, as to stimulate the frame sequencing in the storage counter chain 46–50N. It may also be noted that the bone gates 941–945N always have available to them, through the inputs 946–950N, DC control voltages which may be used at any time during the frame, whether the voltages are being promulgated by some continuous control means 956–960N or whether they have been previously recorded but are being held in the capacitors 966–970N. Therefore, the operation of the bone gates 941–945N may be completely asynchronous with the timing operation controlling the loading and changing of the voltages in the capacitors 966–970N.

The recording network has been described in a rather limited sense in that its inputs comprise a single parameter, such as $\theta$. In actual construction the recording network can be extended to incorporate as many parameters as there are in the basic animation system. In short, with additional parameters, there would be parameter gates in addition to the gates 941–945N, corresponding, for example, not only to the theta gates 69, 77, 85, 93, and 147N, but, in addition, to the phi gates 70, 78, 86, 94, and 148N, the $r$ gates 71, 79, 87, 95 and 149N, and the $i$ gates 72, 80, 88, 96 and 150N. For that matter, other inputs can be recorded, including information as to bone length, background, and any other constant or variable in the system.

*Summary*

This invention thus provides a completely automatic system for producing one or more animated figures on a display which can be transmitted directly in the manner of television or photographed for later showing as a motion picture. It will work with any input whether it be an imaginary input or a real input. The imaginary input provision enables an operator to create a subject and animation for it. The real input, which requires setting of the bone generator for bone lengths corresponding to the physical parts of a real or live figure and creation of skin film for the skin of the real or live figure, allows monitoring of the actions of the real or live figure. With the a priori information available to the device, animation of the real figure requires variations only in those parameters representing change, such as the $\theta$, $\phi$, $r$, and $i$ gates. Consequently, capacitive or resistive connections made to selected parts of the real figure, to sense positional changes in terms of electrical signals, provide low bandwidth information that can be transmitted to the device from any distance for regulation of the appropriate control parameters.

Various changes and modifications may be made within the purview of this invention as will be readily apparent to those skilled in the art. Such changes and modifications are within the scope and teaching of this invention as defined by the claims appended hereto.

What is claimed is:

1. A method of producing an animated display comprising the steps of generating a series of reference voltages, each voltage having a characteristic representing lines on a display scope, each of predetermined length according to the lengths of parts of an object to be displayed, for each reference line voltage applying selected voltages to the deflection plates of the display scope corresponding to the positions of the reference lines, generating a vector voltage, and continuously adding the vector voltage to the reference line voltages as they are drawn on the display tube.

2. The method of claim 1 plus the step of modulating the amplitude of the vector voltage in proportion to the distances of surfaces of the parts of the object from the reference lines.

3. The method of claim 2 plus the step of modulating the intensity of the beam of the display tube in response to a predetermined intensity modulation program.

4. The method of claim 3 wherein the intensity modulation program includes the generation of voltages which are derivatives of the modulated vector voltages and modulating the intensity of the beam of the display tube in response to variations in the derivative voltages.

5. The method of claim 1 wherein the characteristic of each reference voltage which represents a line on the display scope comprises the time duration of the reference voltages with the duration of each reference voltage being proportional to the length of a physical member of the figure, more voltages representing the angular positions of the members, the vector voltages being added serially to the reference voltages as the reference voltages are generated.

6. The method of claim 1 with overlap prevention which comprises the steps of synchronizing the reading of an overlap readout source withdrawing of parts of the figure on the display tube, the overlap readout source having a memory characteristic of what parts of the readout source have been read, and modulating the beam of the display tube in response to the reading of parts of the overlap readout source which have already been read, whereby when parts of the object to be displayed which are nearest the viewer are drawn first on the display tube, those portions of other parts of the object behind the first drawn parts can be blanked out by the said beam modulation.

7. The method of claim 6 plus the step of generating readout voltages by reading a source of background information, modulating the beam of the display tube in response to variations in the readout voltages, and synchronizing the reading of the overlap readout source with reading of the background information, and further modulating the beam of the display tube in response to the reading of the overlap readout source.

8. A system for producing electrical information for use in video readout to display an animated multi-part figure on the face of a display tube comprising a clock, a plurality of controls successively operable by the clock, each for a preselected time duration for generating first voltages, the time duration of each first voltage being proportioned to the length of a part of the figure, a plurality of position parameter networks each operated by a first voltage, each position parameter network having means to generate a voltage for the duration of operation of the control, the voltages from the position parameter networks being proportioned to the positions of the parts of the figure with respect to predetermined reference coordinates, a generating network including means to generate a vector voltage and means to modulate the amplitude of the vector voltage, a voltage combining network for adding the modulated vector voltages to the first voltages.

9. The system of claim 8 including means for synchronizing the modulation of vector voltage with the timing of the first voltage generating controls.

10. The system of claim 8 wherein the position parameter network comprises a plurality of gates, means for providing a variable voltage input to each gate, and means connecting each gate to a first voltage control to open the gates while the first voltage controls are operated.

11. A system for establishing voltages for representing animated figures comprising means to generate a sequence of electrical signals, means triggered by the signals for generating a sequence of positioning voltages, means for generating a series of vector voltages at a rate proportional to the generation of the said electrical signals, means for combining the vector voltages with the positioning voltages, means for varying the positioning voltages, and means for recording selected ones of the positioning and vector voltages.

12. The combination of claim 11 wherein the recording means comprises individual circuits for independent record and playback of each voltage whereby any voltage may be varied and recorded without affecting the record of other voltages.

13. A method for generating and displaying an animated figure comprising the steps of generating a plurality of first voltages, varying the first voltages, deriving voltage components of each first voltage such that each first voltage is the vector resultant of its components, generating a plurality of vector voltages the magnitudes of which are proportional to the thickness of the various physical members of a figure to be displayed, deriving voltage components of each vector voltage, adding the vector voltage components to the first voltage components, resolving the added components into resultant voltages, and establishing a visual display based upon the resultant voltages as a function of time.

14. The method of claim 13 plus transposing the resultant voltages into selective coordinate voltages representing a two dimensional projection of the figure.

15. The method of claim 14 plus the step of blanking out voltages representing parts of the figure behind those represented by the aforesaid two dimensional projection.

16. The method of claim 13 plus adding voltages representing background for the figure and blanking out those background voltages that overlap the resultant voltages.

17. The system of claim 13 including means for modulating the intensity of the visual display in response to a predetermined intensity modulation program.

18. The system of claim 17 wherein the intensity modulation program includes means for generating voltages which are derivatives of the vector voltages, and for modulating the intensity of the visual display.

19. A device for generating voltages for representing a physical body and voltages for animating the physical body comprising means for generating a plurality of length voltages, a characteristic of each being proportional to the length of a different part of the body, means for generating a plurality of position voltages representing angular position parameters of the length voltages with respect to reference coordinates, and means for selectively varying the position, and further including means to transpose the voltages into a display on the face of a display tube and means to change the position of the reference voltage to move the body across the face of the tube voltages.

20. The device of claim 19 including first means for adding voltages representing a skin surface to the length voltages, second means for adding voltages representing a skin outline to the length voltages, and means for selectively operating the first or second means.

21. The device of claim 19 including means for recording selected ones of the length voltages for playback and combination with selected others of the length voltages when the latter are generated.

22. A method of creating voltages for representing a movable figure comprising the steps of generating a plurality of voltages each representing the length of a physical part of the figure, generating a plurality of voltages for each length voltage to position the length voltages with reference to predetermined coordinates, resolving the thus positioned length voltages into at least two geometric components, generating a vector voltage, modulating the amplitude of the vector according to the distances of the physical surfaces from the unresolved length voltages, resolving the vector voltages into at least two geometric components, vectorially adding the vector components to the length voltage components.

23. The method of claim 22 wherein the length voltages and the vector voltages are resolved into three components for three-dimensional representation, plus the step of selectively resolving the three components of the added length and vector components into two components for transmission to the horizontal and vertical deflection controls of a display device for display of the figure.

24. The method of claim 22 wherein the step of resolving the voltages into at least two geometric components includes the steps of sampling sine and cosine wave voltages at such times that the sampled sine and cosine voltages represent the sine and cosine of selected ones of the positioning voltages.

25. A system for producing an animated display on a display scope comprising means for generating in phase, a continuous sine wave and a continuous square wave at relatively high frequency, means for reducing the frequency of the square wave to produce a low frequency frame pulse at a frequency which is a whole fraction of the square wave frequency, counter means for counting a selective number of pulses generated by the square wave as periodic inputs to the counter means, the counter means being triggered to count pulses, a plurality of gates each connected to the output from the counter means, means for programming the gates open while the counter means is counting pulses, each gate having a variable input and an output, the input to some gates representing a first angular position parameter and the input to other gates representing a second angular position parameter, each gate passing its input to its output while the gate is open, the outputs of all gates representing the first parameter being connected together and the outputs of all gates representing the second parameter being connected together whereby the first parameter voltages are transmitted in one series and the second parameter voltages in another series as the counter means operate, and means to resolve the first and second parameter voltage series into corresponding series of horizontal and vertical deflection voltages for serially positioning a display beam on the display scope at frame pulse intervals.

26. The system of claim 25 wherein the resolving means includes means to produce three component voltage series representing three dimensions of the subject for display, and a camera angle network for resolving the three-dimensional voltage series into two-dimensional voltage series, the camera angle network comprising means for generating sine and cosine values of predetermined combinations of the three component voltage series.

27. The system of claim 25 including a gross position network for superposing gross horizontal and vertical deflection voltages upon the foregoing horizontal and vertical deflection voltages to vary the gross position of the display.

28. The system of claim 25 with means to generate a vector voltage, means to modulate the amplitude of the vector voltage, means to resolve the vector voltage into horizontal and vertical deflection voltages, and means for adding the vector horizontal and vertical deflection voltages to the parameter horizontal and vertical deflection voltages.

29. The system of claim 28 wherein the means to generate the vector voltage comprises a scanning beam for scanning a film of variable density according to variations in distance of the surface from the skeleton of the figure, means synchronized with the operation of the counter means for causing the scanning beam to scan the film, and means for transducing variations in the intensity of the scanning beam into a voltage signal of proportionately variable amplitude representing the vector voltage.

30. In an animating device, means to generate a series of a plurality of parameter regulators, means to feed the generated pulses to the regulators in a series of timed sequences, the times of sequences being proportional to the lengths of axial reference lines of particular parts of a figure to be animated, a variable voltage input to each parameter regulator, a first parameter voltage input being proportional to the angular displacement of the axial reference line from first reference coordinates, a second parameter voltage input being proportional to the angular displacement of the axial reference line from second reference coordinates normal to the first reference coordinate, a display tube having horizontal and vertical deflection amplifiers for controlling the position of its scanning beam, and means to generate signals to the horizontal and vertical deflection amplifiers as functions of the said first and second parameter voltages to control the display on the display tube.

31. The animating device of claim 30 including means to add additional voltages to the horizontal and vertical deflection amplifiers corresponding to changing gross positions of the figure being displayed.

32. The animating device of claim 30 including a recording network for selectively recording the parameter voltages in timed sequence, and means to transmit the recorded information to the parameter regulators.

33. The device of claim 30 including means to prevent overlap comprising an overlap readout source, means for reading overlap readout source and for generating output voltages in response thereto, and means for modulating the beam of the display tube in response to the output voltages from the overlap readout source.

34. In an animating device having means to generate first parameter voltages proportional to and for representing angular displacements of a reference line from first predetermined reference coordinates, means to generate second parameter voltages proportional to and for representing angular displacements of the reference line from second predetermined reference coordinates, means to time the generation of the first parameter voltages in proportion to the lengths of members of a figure to be displayed, and means to generate variable vector voltages representing the distances of points on the surfaces of members of the figure from their reference lines in sequence with the generation of their parameter voltages: a network for combining the parameter voltages with the vector voltages to produce voltages representing the members in three dimensions comprising means to generate position voltages, means to generate vector voltages, and means to combine predetermined ones of the generated position voltages with predetermined ones of the generated vector voltages to produce voltages representing the three dimensional coordinates of the figure.

35. The combination of claim 34 together with means to resolve the voltages representing three dimensional components into voltages representing selected two dimensional projections, and means for causing the scanning beam of a display tube to be deflected in horizontal and vertical directions according to the selected two dimensional projection voltages.

36. The combination of claim 35 including an overlap prevention network comprising an overlap scanning device having a scanning beam for scanning a surface, the scanning device having means to produce a first output voltage during scanning of the surface over areas not previously scanned and means to produce a second output voltage different from the first voltage during scanning of the surface over areas previously scanned, means to cause the scanning beam of the scanning device to parallel the movements of the scanning beam of the display tube, and means to moderate the scanning beam of the display tube when the scanning device produces the second voltage output.

37. The combination of claim 36 together with a background reading device for reading a source of background information, the background reading device having a voltage output proportional to the variations in the source of background information, means to produce modulations of the scanning beam of the display device according to the output from the background reading device to display background behind the displayed figure, and means to cause the overlap scanning device to scan its surface parallel to the reading by the background reading device to prevent overlap of background with the displayed figure.

38. A device for producing an animated display comprising means to generate a square wave, means to generate a sine wave synchronized with the generated square wave, a plurality of timing devices, means to generate a cosine wave synchronized with the generated sine wave, means to feed the generated square wave in series with the timing devices, means to vary the time interval of each timing device during which such timing device produces a voltage output proportional to the length of a member of a figure to be displayed, a plurality of parameter regulators associated with each timing device, means to produce a selectively variable voltage output from each parameter regulator during the production of a voltage output from its associated timing device, the voltage output from two parameter regulators associated with each timing device representing the position of a member of the figure with reference to three dimensional coordinate axes, an angle function generator, means to transmit the last named two parameter regulator output voltages, the generated sine wave and the generated cosine wave to the angle function generator, the angle function generator having means to combine the voltages transmitted to it to produce voltages which are the instantaneous values of the two parameter regulator output voltages, means to sample instantaneous values of the generated sine wave and the generated cosine wave voltages in accordance with the function voltages, means to combine the generated function voltages and the sampled sine and cosine voltages, means to integrate the last named function voltages to produce voltages representing the three dimensional coordinates of the figure to be displayed, means to resolve the three dimensional coordinate voltages into two dimensional horizontal and vertical deflection voltages, a display tube having a scanning beam and horizontal and vertical deflection amplifiers to control the position of the scanning beam, and means to transmit the horizontal and vertical deflection voltages to the deflection amplifiers.

39. The device of claim 38 including a film having areas assigned to different members of the figure to be displayed, each area having variations in density proportional to distances of points on the surface of the member from a reference line of the member as defined by the three dimensional coordinate voltages, means to scan the film in synchronization with the passage of voltages through the timing devices for members corresponding to the areas on the film being scanned, a variable output vector voltage from the film scanner having an instantaneous value proportional to the density of the film area instantaneously scanned, and means to combine the vector voltage with the three dimensional coordinate voltages.

40. A method of producing an animated display on a display tube comprising the steps of generating a series of voltages, transmitting the generated voltages to a series of parameter regulators, timing the operation of the parameter regulators for intervals proportional to the lengths of reference lines of particular parts of a figure to be animated, generating variable parameter voltages for periods corresponding to the aforesaid time intervals, one of the parameter voltages being proportional to the angular displacement of a given reference line from a reference coordinate, another of the parameter voltages being proportional to the angular displacement of the reference line from another reference coordinate orthogonal to the first-named reference coordinate, and controlling the amount of horizontal and vertical deflection of the scanning beam of a display tube as functions of the parameter voltages.

41. The method of claim 40 including the step of adding additional voltages to the horizontal and vertical deflection controls of the scanning beam to provide changes in gross positions of the figure being displayed.

42. The method of claim 40 including the steps of recording and selectively re-recording the parameter voltages, and transmitting the recorded information for substitution for the first named parameter voltages.

43. A method of producing voltages usable to establish an animated display comprising the steps of generating first parameter voltages representing angular displacements of a reference line from a first coordinate reference, generating second parameter voltages representing angular displacements of the reference line from a second coordinate reference, orthogonal to the first named reference plane, timing the generation of parameter voltages in proportion to the lengths of members of a figure to be displayed, generating variable vector voltages representing the distances of points on the surfaces of members of the figure from their axial reference lines in sequence with the generation of their parameter voltages, combining the parameter voltages with the vector voltages to produce voltages representing the members in three dimensions.

44. The method of claim 43 including the steps of resolving the voltages representing three dimensional components into voltages representing selected two dimensions, and causing the scanning beam of a display tube to be deflected in horizontal and vertical directions according to the selected two dimensional voltages.

45. The method of claim 44 including the steps of causing a scanning beam of an overlap scanning device to scan a surface with scanning movements parallel to those of the scanning beam of a display tube, producing output voltages from the overlap scanning device according to whether or not the surface scanned by the overlap scanning device has been previously scanned, and modulating the intensity of the scanning beam of the display tube according to the output from the scanning device.

46. A method of producing an animated display which comprises the steps of generating a high frequency square wave, generating a sine wave synchronized with the generated square wave, generating a cosine wave synchronized with the generated sine wave, passing the generated square wave signal through a series of timing devices, varying the time interval of each timing device during which it is governed by the square wave signal with the variable time interval being proportional to the length of a member of the figure to be displayed, generating a plurality of parameter voltages during the time interval for each timing device, varying each parameter voltage selectively according to selected positions of the member with reference to three dimensional coordinate axes, combining the parameter voltages and generated sine and cosine voltages to produce voltages representing trigonometric functions, sampling instantaneous values of the generated sine wave and generated cosine wave voltages according to the function voltages, combining the generated function voltages and the sampled sine and cosine voltages to produce voltages representing other trigonometric functions, integrating the said other trigonometric function voltages to produce voltages presenting the three dimensional coordinate components of the figure to be displayed, resolving the three dimensional coordinate component voltages into two dimensional horizontal and vertical deflection voltages, and controlling the amount of horizontal and vertical deflection of the scanning beam of a display tube according to the horizontal and vertical deflection voltages.

47. In an animating device, means to generate first parameter voltages proportional to and for representing angular displacements of a reference line from a first reference coordinate, means to generate second parameter voltages proportional to and for representing angular displacements of the reference line from a second reference coordinate orthogonal to the first reference coordinate, means to time the generation of the first parameter voltages in proportion to the lengths of members of a figure to be displayed, and means to generate variable vector voltages representing the distances of points on the surfaces of members of the figure from their axial reference lines in sequence with the generation of their parameter voltages, and a network for combining the parameter voltages with the vector voltages to produce voltages representing the members in three dimensions.

48. The combination of claim 47 together with means to resolve the voltages representing three dimensional components into voltages representing selected two dimensions, and means for causing the scanning beam of a display tube to be deflected in horizontal and vertical directions according to the selected two dimensional voltages.

49. The combination of claim 48 including an overlap prevention network comprising an overlap scanning device having a scanning beam for scanning a surface, the scanning device having means to produce a first output voltage during scanning of the surface over areas not previously scanned and means to produce a second output voltage different from the first voltage during scanning of the surface over areas previously scanned, means to cause the scanning beam of the scanning device to parallel the movements of the scanning beam of the display tube, and means to blank out the scanning beam of the display tube when the scanning device produces the second voltage output.

50. The combination of claim 49 together with a background reading device for reading a source of background information, the background scanning device having a voltage output proportional to variations in the source of background information, means to produce modulations of the scanning beam of the display device according to the output from the background reading device to display background behind the displayed figure, and means to cause the overlap scanning device to scan its surface parallel to the reading by the background reading device to prevent overlap of background with the displayed figure.

51. A device for producing an animated display comprising means to generate a square wave, means to generate a sine wave synchronized with the generated square wave, a plurality of timing devices, means to generate a cosine wave synchronized with the generated sine wave, means to feed the generated square wave in series with the timing devices, means to vary the time interval of each timing device during which such timing device produces a voltage output proportional to the length of a member of a figure to be displayed, a plurality of parameter regulators associated with each timing device, means to produce a selectively variable voltage output from each parameter regulator during the production of a voltage output from its associated timing device, the voltage output from two parameter regulators associated with each timing device representing the position of a member of the figure with reference to three dimensional coordinate axes, an angle function generator, means to transmit the last named two parameter regulator output voltages, the generated sine wave and the generated cosine wave to the angle function generator, the angle function generator having means to combine the voltages transmitted to it, means to sample instantaneous values of the generated sine wave and the generated cosine wave voltages, means to combine the voltages combined in the angle function generator with the sampled sine and cosine voltages, means to integrate the last three named function voltages to produce voltages representing the three dimensional coordinates of the figure to be displayed, means to resolve the three dimensional coordinate voltages into two dimensional horizontal and vertical deflection voltages, a display tube having a scanning beam and horizontal and vertical deflection amplifiers to control the position of the scanning beam, and means to transmit the horizontal and vertical deflection voltages to the deflection amplifiers.

52. The device of claim 51 including a film having areas assigned to different members of the figure to be displayed, each area having variations in density proportional to distances of points on the surface of the member from an axial reference line of the member as defined by the three dimensional coordinate voltages, means to scan the film in sequence with the passage of voltages through the timing devices for members corresponding to the areas on the film being scanned, a variable output vector voltage from the film scanner having an instantaneous value proportional to the density of the film area instantaneously scanned, and means to combine the vector voltage with the three dimensional coordinate voltages.

53. A system for establishing voltages representing animated figures comprising means to generate a sequence of electrical signals, means triggered by the signals for generating a sequence of positioning voltages, means for generating a series of vector voltages at a rate proportional to the generation of the said electrical signals, means for combining the vector voltages with the positioning voltages, and means for varying the positioning voltages.

No references cited.

JOHN W. CALDWELL, *Primary Examiner.*

R. L. RICHARDSON, *Assistant Examiner.*